(12) United States Patent
Yasumura

(10) Patent No.: US 7,423,887 B2
(45) Date of Patent: Sep. 9, 2008

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/341,271

(22) Filed: Jan. 26, 2006

(65) Prior Publication Data
US 2006/0176714 A1 Aug. 10, 2006

(30) Foreign Application Priority Data
Feb. 4, 2005 (JP) ............................ P2005-028798

(51) Int. Cl.
*H02M 3/335* (2006.01)

(52) U.S. Cl. ...................... 363/21.02; 363/97

(58) Field of Classification Search .................. 363/20, 363/21.01, 21.02, 21.04, 21.08, 95, 97, 131
See application file for complete search history.

(56) References Cited

U.S. PATENT DOCUMENTS

| 5,991,170 | A | 11/1999 | Nagai et al. |
| 6,366,476 | B1 * | 4/2002 | Yasumura ................. 363/21.02 |
| 6,370,043 | B1 | 4/2002 | Yasumura |
| 6,483,721 | B2 | 11/2002 | Terashi et al. |
| 6,515,875 | B2 * | 2/2003 | Yasumura ................. 363/21.02 |
| 6,587,358 | B1 | 7/2003 | Yasumura |
| 6,654,259 | B2 | 11/2003 | Koshita et al. |
| 6,687,137 | B1 * | 2/2004 | Yasumura ................. 363/21.01 |
| 6,831,846 | B2 * | 12/2004 | Yasumura ................. 363/21.02 |
| 6,934,167 | B2 | 8/2005 | Jang et al. |
| 7,054,167 | B2 * | 5/2006 | Yasumura ..................... 363/16 |

FOREIGN PATENT DOCUMENTS

| EP | 0556134 | | 8/1993 |
| EP | 1182769 | | 2/2002 |
| JP | 06-327246 A | | 11/1994 |
| JP | 2000-134925 A | | 5/2000 |
| JP | 2000-152617 | | 5/2000 |
| JP | 2003143852 | | 5/2003 |
| JP | 2003143852 A | * | 5/2003 |
| JP | 2003-235259 A | | 8/2003 |
| JP | 2004-194105 A | | 7/2004 |

* cited by examiner

*Primary Examiner*—Adolf Berhane
(74) *Attorney, Agent, or Firm*—Lerner, David, Littenberg, Krumholz & Mentlik, LLP

(57) ABSTRACT

A voltage resonant converter is provided with a secondary side parallel resonant circuit, and an isolated converter transformer PIT is set in a state of loose coupling at a coupling coefficient k=about 0.7 or lower. Thus a steep unimodal characteristic is obtained as a constant-voltage control characteristic to reduce a control range of switching frequency which range is necessary for stabilization. A primary side parallel resonance frequency fo1 and a secondary side parallel resonance frequency fo2 are set so as to obtain favorable power conversion efficiency characteristics.

5 Claims, 11 Drawing Sheets

Pomax=200w

Pomin=0W

Pomax=200w

Pomin=0W

SWITCHING POWER SUPPLY CIRCUIT

CROSS-REFERENCE TO RELATED APPLICATIONS

The present invention contains subject matter related to Japanese Patent Application JP 2005-028798 filed in the Japanese Patent Office on Feb. 4, 2005, the entire contents of which being incorporated herein by reference.

BACKGROUND OF THE INVENTION

The present invention relates to a switching power supply circuit including a voltage resonant converter.

As so-called soft-switching power supply of a resonant type, a current resonant type and a voltage resonant type are widely known. In a present situation, a current resonant converter having two switching devices coupled by a half-bridge coupling system is in wide use because such a current resonant converter is easily put to practical use.

However, the characteristics of a high withstand voltage switching device, for example, are now being improved, and therefore the problem of withstand voltage in putting a voltage resonant converter to practical use is being cleared up. In addition, a voltage resonant converter formed by a single-ended system with one switching device is known to be advantageous as compared with a current resonant forward converter having one switching device in terms of input feedback noise, the noise component of a direct-current output voltage line, and the like.

FIG. 12 shows an example of configuration of a switching power supply circuit including a voltage resonant converter of the single-ended system.

In the switching power supply circuit shown in FIG. 12, a rectifying and smoothing circuit formed by a bridge rectifier circuit Di and a smoothing capacitor Ci rectifies and smoothes an alternating input voltage VAC, and thereby generates a rectified and smoothed voltage Ei as a voltage across the smoothing capacitor Ci.

Incidentally, a noise filter formed by a set of common mode choke coils CMC and two across capacitors CL and removing common-mode noise is provided in the line of a commercial alternating-current power supply AC.

The rectified and smoothed voltage Ei is input as a direct-current input voltage to the voltage resonant converter. As described above, the voltage resonant converter employs the single-ended system with one switching device Q1. The voltage resonant converter in this case is an externally excited converter. The MOS-FET switching device Q1 is switching-driven by an oscillation and drive circuit 2.

A MOS-FET body diode DD is connected in parallel with the switching device Q1. A primary-side parallel resonant capacitor Cr is connected in parallel with the source and drain of the switching device Q1.

The primary-side parallel resonant capacitor Cr forms a primary side parallel resonant circuit (voltage resonant circuit) in conjunction with the leakage inductance L1 of a primary winding N1 of an isolated converter transformer PIT. This primary side parallel resonant circuit provides a voltage resonant operation as the switching operation of the switching device Q1.

The oscillation and drive circuit 2 applies a gate voltage as a drive signal to the gate of the switching device Q1 to switching-drive the switching device Q1. Thus the switching device Q1 performs switching operation at a switching frequency corresponding to the cycle of the drive signal.

The isolated converter transformer PIT transmits the switching output of the switching device Q1 to a secondary side.

The isolated converter transformer PIT has for example an EE type core formed by combining E-type cores of ferrite material with each other. A winding part is divided into a primary side winding part and a secondary side winding part. The primary winding N1 and a secondary winding N2 are wound around the central magnetic leg of the EE type core.

In addition, a gap of about 1.0 mm is formed in the central magnetic leg of the EE type core of the isolated converter transformer PIT. Thereby a coupling coefficient k=about 0.80 to 0.85 is obtained between the primary side and the secondary side. The coupling coefficient k at this level may be considered to represent loose coupling, and therefore a state of saturation is not easily obtained. The value of the coupling coefficient k is a factor in setting the leakage inductance (L1).

One end of the primary winding N1 of the isolated converter transformer PIT is inserted between the switching device Q1 and the positive electrode terminal of the smoothing capacitor Ci. Thereby, the switching output of the switching device Q1 is transmitted to the primary winding N1. An alternating voltage induced by the primary winding N1 occurs in the secondary winding N2 of the isolated converter transformer PIT.

In this case, a secondary side parallel resonant capacitor C2 is connected in parallel with the secondary winding N2. Thus, the leakage inductance L2 of the secondary winding N2 and the capacitance of the secondary side parallel resonant capacitor C2 form a secondary side parallel resonant circuit (voltage resonant circuit).

In addition, a half-wave rectifier circuit is formed by connecting a rectifier diode Do1 and a smoothing capacitor Co to the secondary side parallel resonant circuit as shown in the figure. This half-wave rectifier circuit generates a secondary side direct-current output voltage Eo having a level corresponding to once an alternating voltage V2 obtained in the secondary winding N2 (secondary side parallel resonant circuit) as a voltage across the smoothing capacitor Co. The secondary side direct-current output voltage Eo is supplied to a load, and is also input to a control circuit 1 as a detection voltage for constant-voltage control.

The control circuit 1 inputs a detection output obtained by detecting the level of the secondary side direct-current output voltage Eo input as the detection voltage to an oscillation and drive circuit 2.

The oscillation and drive circuit 2 controls the switching operation of the switching device Q1 according to the level of the secondary side direct-current output voltage Eo which level is indicated by the detection output input to the oscillation and drive circuit 2 so as to make the secondary side direct-current output voltage Eo constant at a predetermined level. That is, the oscillation and drive circuit 2 generates and outputs a drive signal for controlling the switching operation. Thereby control is performed to stabilize the secondary side direct-current output voltage Eo.

FIGS. 13A and 13B and FIG. 14 show results of experiments on the power supply circuit having the configuration shown in FIG. 12. In conducting the experiments, principal parts of the power supply circuit of FIG. 12 are set as follows as conditions of VAC=100 V corresponding to an AC 100 V system.

For the isolated converter transformer PIT, an EER-35 core is selected, and the gap of the central magnetic leg is set to a gap length of 1 mm. As for the respective numbers of turns of the primary winding. N1 and the secondary winding N2, N1=43 T and N2=43 T. As for the coupling coefficient k of the isolated converter transformer PIT, k=0.81 is set.

The primary-side parallel resonant capacitor Cr=6800 pF and the secondary side parallel resonant capacitor C2=0.01 μF are selected. Accordingly, the resonant frequency fo1=175 kHz of the primary side parallel resonant circuit and the resonant frequency fo2=164 kHz of the secondary side parallel resonant circuit are set.

The rated level of the secondary side direct-current output voltage Eo is 135 V. Load power handled by the power supply circuit is in a range of maximum load power Pomax=200 W to minimum load power Pomin=0 W.

FIGS. 13A and 13B are waveform charts showing the operations of principal parts in the power supply circuit shown in FIG. 12 on the basis of the switching cycle of the switching device Q1. FIG. 13A shows a switching voltage V1, a switching current IQ1, a primary winding current I1, a secondary winding voltage V2, a secondary winding current I2, and a secondary side rectified current ID1 at the maximum load power Pomax=200 W. FIG. 13B shows the switching voltage V1, the switching current IQ1, the primary winding current I1, the secondary winding voltage V2, the secondary winding current I2, and the secondary side rectified current ID1 at the minimum load power Pomin=0 W.

The switching voltage V1 is a voltage obtained across the switching device Q1. The voltage V1 is at a zero level in a period TON in which the switching device Q1 is on, and forms a resonant pulse having a sinusoidal waveform in a period TOFF in which the switching device Q1 is off. The resonant pulse waveform of the voltage V1 indicates that the operation of the primary side switching converter is voltage resonant type operation.

The switching current IQ1 flows through the switching device Q1 (and the body diode DD). The switching current IQ1 is at a zero level in the period TOFF. In the period TON, the switching current IQ1 flows through the body diode DD in a forward direction and is thus of negative polarity at a turn-on time, and is thereafter inverted to flow through the drain and the source of the switching device Q1 and increase until turn-off timing. Therefore, the switching current IQ1 has a peak level in the turn-off timing.

The primary winding current I1 flowing through the primary winding N1 is obtained by combining a current component flowing as the switching current IQ1 in the period TON with a current flowing through the primary-side parallel resonant capacitor Cr in the period TOFF. The primary winding current I1 has a waveform as shown in the figures.

As for the operation of a secondary side rectifier circuit, at the maximum load power Pomax=200 W, the rectified current ID1 flowing through the rectifier diode Do1 has a peak level at the time of turning on the rectifier diode Do1, and thereafter decreases to a zero level in a waveform as shown in FIG. 13A. The rectified current ID1 is at the zero level during the off period of the rectifier diode Do1. Incidentally, at the minimum load power Pomin=0 W, the rectified current ID1 is at the zero level even during the on period.

The secondary winding voltage V2 in this case is obtained in the parallel circuit of the secondary winding N2 and the secondary side parallel resonant capacitor C2. The secondary winding voltage V2 is clamped at the secondary side direct-current output voltage Eo during the on period during which the secondary side rectifier diode Do1 conducts. During the off period of the secondary side rectifier diode Do1, the secondary winding voltage V2 forms a sinusoidal waveform in a direction of negative polarity. The secondary winding current I2 flowing through the secondary winding N2 is obtained by combining the rectified current ID1 with a current flowing through the secondary side parallel resonant circuit (N2(L2)// C2). The secondary winding current I2 flows in waveforms as shown in FIGS. 13A and 13B, for example.

FIG. 14 shows switching frequency fs, the on period TON and the off period TOFF of the switching device Q1, and AC→DC power conversion efficiency (ηAC→DC) with respect to load variation in the power supply circuit shown in FIG. 12.

The AC→DC power conversion efficiency (ηAC→DC) is 90% or more in a range of load power Po=100 W to 200 W. It is known that the single-ended system in which the voltage resonant converter has one switching device Q1, in particular, provides favorable power conversion efficiency.

The switching frequency fs, the on period TON, and the off period TOFF shown in FIG. 14 represent switching operation as characteristics of constant-voltage control against load variation in the power supply circuit of FIG. 12. In this case, the switching frequency fs is controlled to be raised as the load becomes lighter. As for the on period TON and the off period TOFF, the off period TOFF is substantially constant irrespective of load variation, whereas the on period TON is shortened as the load becomes lighter. That is, the power supply circuit shown in FIG. 12 variably controls the switching frequency in such a manner as to reduce the on period TON as the load becomes lighter, for example, while keeping the off period TOFF constant.

By thus variably controlling the switching frequency, inductive impedance obtained by providing the primary side parallel resonant circuit and the secondary side parallel resonant circuit is varied. By varying the inductive impedance, an amount of power transmitted from the primary side to the secondary side and an amount of power transmitted from the secondary side parallel resonant circuit to the load are changed, so that the level of the secondary side direct-current output voltage Eo is changed. The secondary side direct-current output voltage Eo is thereby stabilized.

FIG. 15 schematically shows the constant-voltage control characteristics of the power supply circuit shown in FIG. 12 by relation between the switching frequency fs (kHz) and the secondary side direct-current output voltage Eo.

Letting fo1 be the resonant frequency of the primary side parallel resonant circuit and fo2 be the resonant frequency of the secondary side parallel resonant circuit, in the circuit of FIG. 12, the secondary side parallel resonance frequency fo2 is lower than the primary side parallel resonance frequency fo1, as described above.

As for constant-voltage control characteristics with respect to the switching frequency fs under a condition of a constant alternating input voltage VAC, as shown in FIG. 15, characteristic curves A and B respectively represent constant-voltage control characteristics at the maximum load power Pomax and the minimum load power Pomin under the resonant impedance corresponding to the resonant frequency fo1 of the primary side parallel resonant circuit, and characteristic curves C and D respectively represent constant-voltage control characteristics at the maximum load power Pomax and the minimum load power Pomin under the resonant impedance corresponding to the resonant frequency fo2 of the secondary side parallel resonant circuit.

Further, when the primary side parallel resonant circuit and the secondary side parallel resonant circuit are provided as in the circuit of FIG. 12, there is an intermediate resonant frequency fo between the resonant frequencies fo1 and fo2. A characteristic curve E represents a resonant impedance characteristic based on relation between the intermediate resonant frequency fo and the switching frequency fs at the maximum load power Pomax. A characteristic curve F represents a resonant impedance characteristic based on the relation between the intermediate resonant frequency fo and the switching frequency fs at the minimum load power Pomin.

With the voltage resonant converter provided with the secondary side parallel resonant circuit, the level of the secondary side direct-current output voltage Eo is determined by the resonant impedance characteristics of the intermediate resonant frequency fo in relation to the switching frequency fs. The voltage resonant converter shown in FIG. 12 employs a so-called lower side control system in which the switching frequency fs is variably controlled in a frequency region lower than the intermediate resonant frequency fo.

A variable range (necessary control range) of the switching frequency fs which range is necessary to achieve constant voltage with the rated level (135 V in the case of the circuit of FIG. 12) of the secondary side direct-current output voltage Eo as a target value by switching frequency control corresponding to lower side control under the characteristics represented as the characteristic curves E and F corresponding to the intermediate resonant frequency fo in FIG. 15 is a section indicated by Δfs. In other words, by varying the switching frequency to a required value according to load variation in the frequency range corresponding to the section indicated by Δfs, the secondary side direct-current output voltage Eo is controlled to be at the rated level tg.

For details, reference should be made to Japanese Patent Laid-open No. 2000-152617.

With diversification of various electronic apparatuses, there is a demand for a so-called wide range capability that enables the power supply circuit to operate dealing with the commercial alternating-current power supply input of either of an AC 100 V system and an AC 200 V system.

As described above, the power supply circuit having the configuration shown in FIG. 12 operates so as to stabilize the secondary side direct-current output voltage Eo by switching frequency control, and the variable range (necessary control range) of the switching frequency fs which range is necessary to stabilize the secondary side direct-current output voltage Eo is indicated by Δfs as described with reference to FIG. 15.

The power supply circuit shown in FIG. 12 deals with load variation in a relatively wide range of 200 W to 0 W. The actual necessary control range of the power supply circuit of FIG. 12 meeting this load condition is Δfs=96.7 kHz, which is a relatively wide range, with fs=117.6 kHz to 208.3 kHz.

The level of the secondary side direct-current output voltage Eo is varied by change in the level of the alternating input voltage VAC, of course. That is, as the level of the alternating input voltage VAC is increased or decreased, the level of the secondary side direct-current output voltage Eo is similarly increased or decreased.

It can thus be said that the level of the secondary side direct-current output voltage Eo is varied more in dealing with the variation of alternating input voltage in a wide range from the AC 100 V system to the AC 200 V system than in dealing with the variation of the alternating input voltage in a single range of only the AC 100 V system or only the AC 200 V system, for example. To perform constant-voltage control operation by dealing with the thus extended variation in the level of the secondary side direct-current output voltage Eo requires a wider necessary control range obtained by extending the above-mentioned range of 117.6 kHz to 208.3 kHz in a direction of higher frequencies.

However, an upper limit of driving frequency handled by an IC (oscillation and drive circuit 2) for driving the switching device in the present situation is about 200 kHz. In addition, even if an IC is developed which can drive the switching device at high frequencies as mentioned above, the high-frequency driving of the switching device significantly decreases power conversion efficiency, and thus makes it practically impossible to put the power supply circuit to practical use.

It is thus understood that it is very difficult to realize a wide range capability by the configuration of the power supply circuit shown in FIG. 12, for example.

Because of such a situation, when a switching power supply circuit including a resonant converter realizes a wide range-capable operation, the switching power supply circuit employs a configuration for switching the configuration of the primary side switching converter to half-bridge/full-bridge configuration according to the commercial alternating-current power supply input of the AC 100 V system/200 V system, for example. Alternatively, the operation of a rectifier circuit rectifying the alternating input voltage VAC is switched to full-wave rectification/voltage doubler rectification according to the commercial alternating-current power supply input of the AC 100 V system/200 V system.

However, the following problems occur when switching is performed between the circuit configurations for the AC 100 V system and the AC 200 V system.

For example, for such switching according to the level of commercial alternating-current power, a threshold value (for example 150 V) is set for input voltage. Circuit switching is performed to the AC 200 V system when the input voltage exceeds the threshold value, and to the AC 100 V system when the input voltage does not exceed the threshold value. When only such simple switching is performed, however, switching may be performed to the AC 100 V system in response to a temporary decrease in the alternating input voltage due to an instantaneous power interruption or the like during input of the AC 200 V system, for example. Specifically, taking a configuration that switches rectifying operation as an example, there is a possibility that the input of the AC 200 V system is determined to be that of the AC 100 V system, and switching is thus performed to a voltage doubler rectifier circuit, so that a switching device or the like exceeds a withstand voltage thereof and consequently breaks down.

Accordingly, in order to prevent the above-described erroneous operation, an actual circuit detects not only the direct-current input voltage of the main switching converter but also the direct-current input voltage of a converter circuit on a standby power supply side.

However, thus detecting the direct-current input voltage of the converter circuit on the standby power supply side means that for example a comparator IC for comparing the input voltage with a reference voltage is incorporated. This increases the number of parts, and thus contributes to increases in circuit manufacturing cost and circuit board size.

In addition, thus detecting the direct-current input voltage of the converter on the standby power supply side for the purpose of preventing erroneous operation means that the wide range-ready power supply circuit can be actually used in only electronic devices having a standby power supply in addition to a main power supply. That is, electronic devices in which the power supply circuit can be mounted are limited to types having a standby power supply, and thus a range of applications of the power supply circuit is correspondingly narrowed.

The configuration that switches between a half-bridge configuration and a full-bridge configuration requires at least four switching devices for the full-bridge configuration. That is, while only two switching devices are required for half-bridge configuration when the switching is unnecessary, two other switching devices need to be added in this case.

The configuration that switches rectifying operation requires two smoothing capacitors Ci to obtain voltage doubler rectifier operation. That is, one smoothing capacitor Ci needs to be added as compared with a configuration that performs only full-wave rectifier operation.

In these respects, the wide range-ready configurations involving the circuit switching as described above increase circuit manufacturing cost and the size of a power supply circuit board. Of parts forming a power supply circuit, a smoothing capacitor Ci or the like in the configuration that switches rectifying operation, in particular, falls under the category of large parts, thus contributing to further increase in the size of the board.

Another problem of the wide control range of the switching frequency as described above is a degradation in quick response characteristics in stabilizing the secondary side direct-current output voltage Eo.

Some recent electronic devices in particular involve a load condition referred to as a so-called switching load, in which load power is changed instantaneously between a maximum load and no load according to for example on/off operation of various driving parts. The power supply circuit needs to perform constant-voltage control on the secondary side direct-current output voltage in response to the load power thus varied quickly over a wide range.

However, with a wide switching frequency control range as described above, it takes a correspondingly long time to change to a switching frequency necessary for the constant-voltage control dealing with the load varied between a maximum value and a minimum value. That is, constant-voltage control response is slow.

SUMMARY OF THE INVENTION

The power supply circuit shown in FIG. 12 has the primary side voltage resonant converter. The power supply circuit having such a configuration is advantageous in terms of power conversion efficiency, as described above. In consideration of recent energy situations and environment situations, for example, electronic devices are desired to have higher power conversion efficiency. Accordingly, the power supply circuit itself included in an electronic device is desired to be further improved in power conversion efficiency.

Accordingly, in view of the above problems, a switching power supply circuit according to an embodiment of the present invention is formed as follows.

The switching power supply circuit includes: rectifying and smoothing means for obtaining a direct-current input voltage by rectifying and smoothing an alternating input voltage; switching means formed with a switching device supplied with the direct-current input voltage and performing switching operation; and switching-driving means for switching-driving the switching device.

The switching power supply circuit further includes an isolated converter transformer formed by at least winding a primary winding supplied with a switching output obtained by the switching operation of the switching means and a secondary winding in which an alternating voltage is induced by the switching output obtained in the primary winding.

The switching power supply circuit further includes a primary side parallel resonant circuit formed by at least a leakage inductance component of the primary winding of the isolated converter transformer and a capacitance of a primary side parallel resonant capacitor, the primary side parallel resonant circuit converting operation of the switching means into a voltage resonant type operation.

The switching power supply circuit further includes a secondary side parallel resonant circuit formed by a leakage inductance component of the secondary winding of the isolated converter transformer and a capacitance of a secondary side parallel resonant capacitor connected in parallel with the secondary winding.

The switching power supply circuit further includes: secondary side direct-current output voltage generating means for generating a secondary side direct-current output voltage by performing a rectifying operation on the alternating voltage induced in the secondary winding of the isolated converter transformer and input to the secondary side direct-current output voltage generating means and smoothing a rectified output resulting from the rectifying operation by a secondary side smoothing capacitor; and constant-voltage control means for performing constant-voltage control on the secondary side direct-current output voltage by varying switching frequency of the switching means by controlling the switching-driving means according to level of the secondary side direct-current output voltage.

A coupling coefficient for loose coupling between a primary side and a secondary side of the isolated converter transformer is set such that an electromagnetic coupling type resonant circuit formed with the primary side parallel resonant circuit and the secondary side parallel resonant circuit has a unimodal characteristic as characteristic of output in response to an input of a frequency signal having the switching frequency. In addition, a resonant frequency of the primary side parallel resonant circuit and a resonant frequency of the secondary side parallel resonant circuit are set so as to obtain power conversion efficiency at a certain level and higher under predetermined load conditions at least.

The thus formed power supply circuit employs the fundamental configuration of a voltage resonant converter provided with the secondary side parallel resonant circuit on the secondary side. That is, the power supply circuit has a secondary side parallel resonant circuit on each of the primary side and the secondary side. Thus a coupling type resonant circuit is formed by the electromagnetic coupling of the isolated converter transformer. Then, by setting the isolated converter transformer in a state of loose coupling at a predetermined coupling coefficient, a steep unimodal characteristic can be obtained as characteristic of output in response to the frequency signal (switching output) having the switching frequency as an input to the coupling type resonant circuit. As a result, a variable control range (necessary control range) of the switching frequency which range is necessary to stabilize the secondary side direct-current output voltage is reduced.

In addition, the resonant frequency of the primary side parallel resonant circuit and the resonant frequency of the secondary side parallel resonant circuit are set so as to obtain power conversion efficiency characteristics at a certain level and higher under predetermined load conditions.

Thus, the present invention reduces the variable control range, that is, the necessary control range of the switching frequency which range is necessary for constant-voltage control for the voltage resonant converter provided with the secondary side parallel resonant circuit.

Thereby the wide range capability of the voltage resonant switching converter can be easily realized by only switching frequency control.

As for a fundamental configuration for realizing such a wide range capability, it suffices to obtain a required coupling coefficient in the isolated converter transformer of the voltage resonant converter provided with the secondary side parallel resonant circuit. It can thus be said that the wide range capability is realized without increases in cost, circuit size, weight and the like due to increase in the number of parts, for example.

Further, according to the present invention, the resonant frequency of the primary side parallel resonant circuit and the resonant frequency of the secondary side parallel resonant circuit are set so as to obtain power conversion efficiency at a certain level and higher under load conditions of predetermined load power. A voltage resonant converter inherently has a characteristic of high power conversion efficiency. The present invention can provide a power supply circuit having a characteristic of better power conversion efficiency as a power supply circuit including a voltage resonant converter.

DETAILED DESCRIPTION

Figure 1:
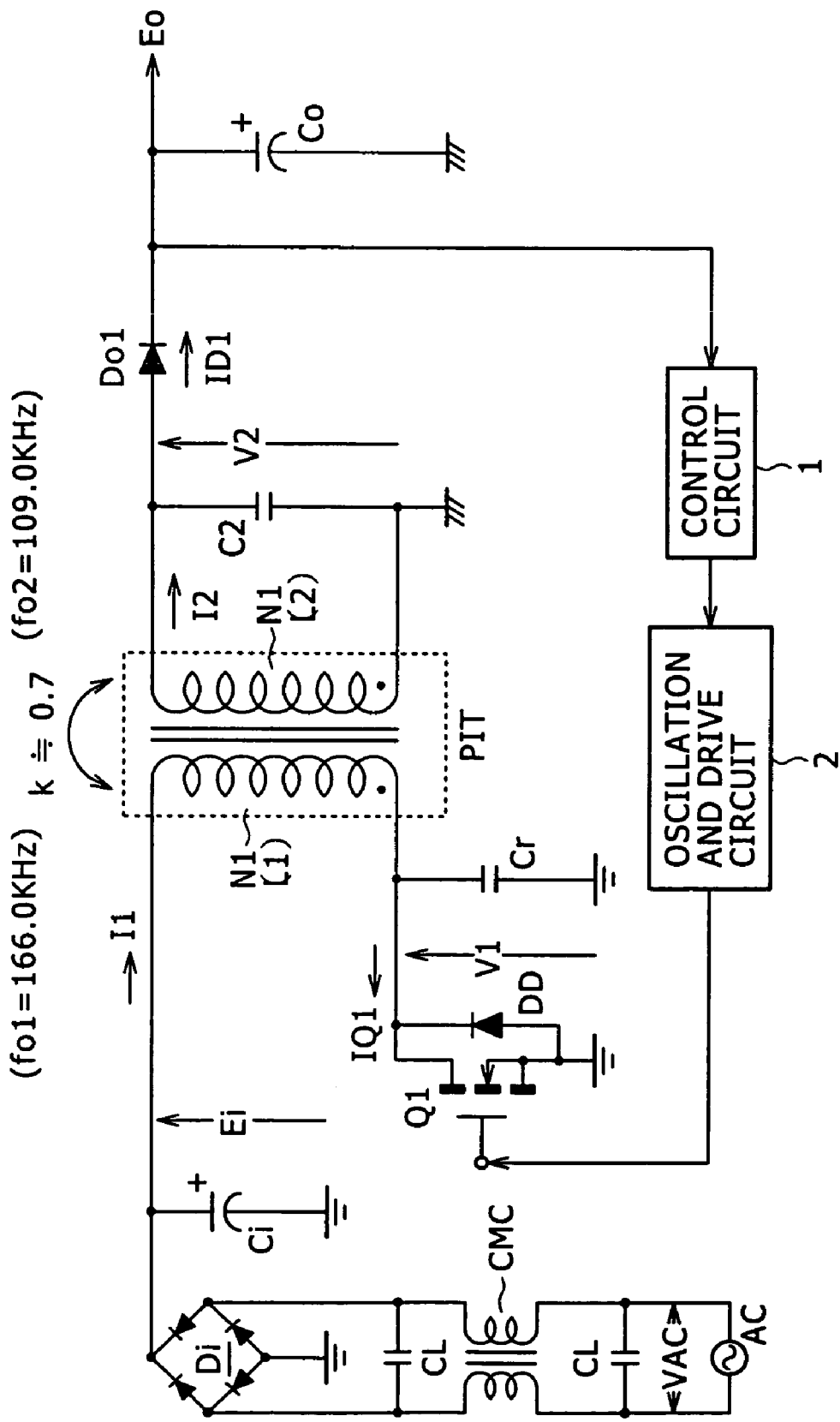
FIG. 1 is a circuit diagram showing an example of configuration of a power supply circuit according to a first embodiment of the present invention.

A circuit diagram of FIG. 1 shows an example of configuration of a power supply circuit according to a first embodiment as the best mode (an embodiment) for carrying out the invention. The power supply circuit shown in this figure employs a fundamental configuration of a voltage resonant switching converter using a single-ended system.

In the switching power supply circuit shown in this figure, a set of common mode choke coils CMC and two across capacitors CL are inserted in the line of a commercial alternating-current power supply AC, as shown in the figure. The common mode choke coils CMC and the across capacitors CL and CL form a noise filter for eliminating common mode noise superimposed on the line of the commercial alternating-current power supply AC.

An alternating input voltage VAC is rectified by a bridge rectifier circuit Di. A smoothing capacitor Ci is charged with the rectified output of the bridge rectifier circuit Di. Thereby a rectified and smoothed voltage Ei is obtained as a voltage across the smoothing capacitor Ci. The rectified and smoothed voltage Ei is a direct-current input voltage for the switching converter in a subsequent stage.

In FIG. 1, the switching converter supplied with the rectified and smoothed voltage Ei as the direct-current input voltage and performing switching operation is formed as a voltage resonant converter of a single-ended system having one switching device Q1, for example. A high withstand voltage MOS-FET is selected as the switching device Q1 in this case. A system for driving the voltage resonant converter in this case is an externally exciting system in which the switching device is switching-driven by an oscillation and drive circuit 2.

A switching driving signal (voltage) output from the oscillation and drive circuit 2 is applied to the gate of the switching device Q1.

The drain of the switching device Q1 is connected to the winding start end part of a primary winding N1 of an isolated converter transformer PIT to be described later. The winding termination end part of the primary winding N1 is connected to the positive electrode terminal of the smoothing capacitor Ci. Thus, in this case, the direct-current input voltage (Ei) is supplied to the switching device Q1 via a series connection of the primary winding N1. The source of the switching device Q1 is connected to a primary side ground.

Since a MOS-FET is selected as the switching device Q1 in this case, a body diode DD is included in the switching device Q1 so as to be connected in parallel with the drain and source of the switching device Q1, as shown in FIG. 1. The body diode DD has an anode connected to the source of the switching device Q1, and a cathode connected to the drain of the switching device Q1. The body diode DD forms a path for passing a switching current in an opposite direction which current is generated by on/off operation (switching operation) of the switching device Q1.

A primary-side parallel resonant capacitor Cr is connected in parallel with the drain and the source of the switching device Q1.

The capacitance of the primary-side parallel resonant capacitor Cr and a leakage inductance L1 of the primary winding N1 of the isolated converter transformer PIT form a primary side parallel resonant circuit (voltage resonant circuit) for a switching current flowing through the switching device Q1. This primary side parallel resonant circuit performs resonant operation, whereby voltage resonant type operation is obtained as switching operation of the switching device Q1. Accordingly, a sinusoidal resonant pulse waveform is obtained as a switching voltage (drain-to-source voltage) V1 across the switching device Q1 during the off period of the switching device Q1.

The oscillation and drive circuit 2 includes an oscillating circuit to drive the switching device Q1 by an externally exciting system, for example. The oscillation and drive circuit 2 generates a drive signal as a gate voltage for switching-driving the MOS-FET on the basis of an oscillating signal obtained from the oscillating circuit, and applies the drive signal to the gate of the switching device Q1. Thus the switching device Q1 performs continuous on/off operation according to a switching frequency corresponding to the cycle of the drive signal. That is, the switching device Q1 performs switching operation.

The isolated converter transformer PIT transmits the switching output of the primary side switching converter to a secondary side with the primary side and the secondary side insulated from each other against direct current.

Figure 2:
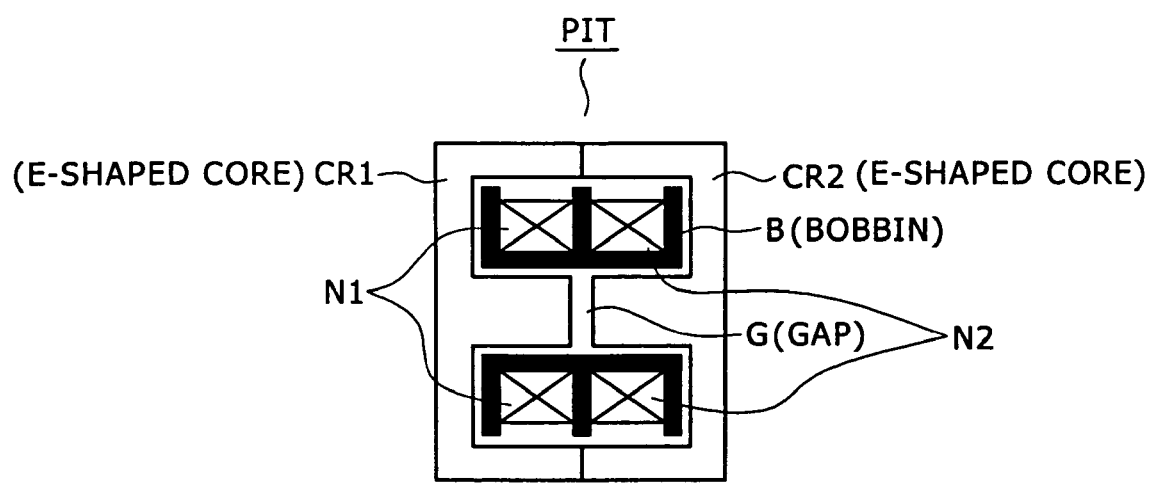
FIG. 2 is a diagram showing an example of structure of an isolated converter transformer provided in the power supply circuit according to the embodiment.

FIG. 2 is a sectional view showing an example of structure of the isolated converter transformer PIT provided in the power supply circuit of FIG. 1.

As shown in FIG. 2, the isolated converter transformer PIT has an EE type core (EE-shaped core) formed by combining E-shaped cores CR1 and CR2 of ferrite material with each other in such a manner that the magnetic legs of the core CR1 are opposed to the magnetic legs of the core CR2

The isolated converter transformer PIT also has a bobbin B formed by a resin, for example, and having a primary side winding part and a secondary side winding part divided from each other so as to be independent of each other. The primary winding N1 is wound around one winding part of the bobbin B. A secondary winding N2 is wound around the other winding part of the bobbin B. The bobbin B thus wound with the primary side winding and the secondary side winding is attached to the above-described EE type core (CR1 and CR2). Thereby the primary side winding and the secondary side winding are wound around the central magnetic leg of the EE type core in respective different winding regions. The structure of the isolated converter transformer PIT as a whole is thus obtained.

In addition, a gap G having a gap length of about 2 mm or more, for example, is formed in the central magnetic leg of the EE type core as shown in the figure. Thereby a state of loose coupling with a coupling coefficient k=about 0.7 or lower, for example, is obtained. That is, a state of even looser coupling is obtained than in the isolated converter transformer PIT of the prior art power supply circuit shown in FIG. 12. Incidentally, the gap G can be formed by making the central magnetic leg of the E-type cores CR1 and CR2 shorter than the two outer magnetic legs of the E-type cores CR1 and CR2.

As described above, one end of the primary winding N1 of the isolated converter transformer PIT is connected to the drain of the switching device Q1. Thereby, the switching output of the switching device Q1 is transmitted to the primary winding N1, so that an alternating voltage occurs in the primary winding N1.

An alternating voltage induced by the primary winding N1 occurs on the secondary side of the isolated converter transformer PIT.

A secondary side parallel resonant capacitor C2 is connected in series with the secondary winding N2. Thus, the leakage inductance L2 of the secondary winding N2 and the capacitance of the secondary side parallel resonant capacitor C2 form a secondary side parallel resonant circuit. This secondary side parallel resonant circuit performs resonant operation according to rectifying operation of a secondary side rectifier circuit to be described later. That is, voltage resonant operation is obtained on both the primary side and the secondary side.

The secondary side rectifier circuit in this case is formed as a half-wave rectifier circuit by connecting one rectifier diode Do1 and one smoothing capacitor Co to the secondary winding N2 connected in parallel with the secondary side parallel resonant capacitor C2 as described above. As for a mode of connection of this half-wave rectifier circuit, the winding termination end part side of the secondary winding N2 is connected with the anode of the rectifier diode Do1. The cathode of the rectifier diode Do1 is connected to the positive electrode terminal of the smoothing capacitor Co. The winding start end part of the secondary winding N2 and the negative electrode terminal of the smoothing capacitor Co are connected to a secondary side ground. Incidentally, since the rectifier diode Do1 performs on/off operation at a relatively high frequency corresponding to the switching frequency, a fast type (fast recovery type) diode is selected as the rectifier diode Do1.

In the thus formed half-wave rectifier circuit, the rectifier diode Do1 conducts to pass a rectified current and charge the smoothing capacitor Co with the rectified current in a half-wave period in which a secondary winding voltage V2 is of positive polarity on the winding termination end part side of the secondary winding N2. Thereby a secondary side direct-current output voltage Eo having a level corresponding to once the level of the alternating voltage induced in the secondary winding N2 is obtained as a voltage across the smoothing capacitor Co.

The secondary side direct-current output voltage Eo is supplied to a load. The secondary side direct-current output voltage Eo also branches off to be output as a detection voltage to a control circuit 1.

The control circuit 1 supplies the oscillation and drive circuit 2 with a detection output according to change in the level of the secondary side direct-current output voltage Eo input to the control circuit 1. The oscillation and drive circuit 2 drives the switching device Q1 while changing the switching frequency according to the detection output of the control circuit 1 which output is input to the oscillation and drive circuit 2. The changing of the switching frequency is an operation of variably controlling the period TON of the switching device Q1 while fixing the period TOFF of the switching device Q1. This operation is constant-voltage control operation for the secondary side direct-current output voltage.

By variably controlling the switching frequency of the switching device Q1 as described above, the resonant impedances of the primary side and the secondary side in the power supply circuit are changed, so that an amount of power transmitted from the primary winding N1 to the secondary winding N2 of the isolated converter transformer PIT and an amount of power to be supplied from the secondary side rectifier circuit to the load are changed. The level of the secondary side direct-current output voltage Eo is thereby controlled so as to cancel variations in the level of the secondary side direct-current output voltage Eo. That is, the secondary side direct-current output voltage Eo is stabilized.

Actual principal parts of the power supply circuit having the circuit configuration shown in FIG. 1 are formed by making settings as follows.

For the isolated converter transformer PIT, an EER-35 core is selected, and the gap G is set to a gap length of 2.2 mm. As for the respective numbers T of turns of the primary winding N1 and the secondary winding N2, N1=63 T and N2=25 T are selected. A voltage induced per turn of the secondary winding N2 is 5.4 V/T. Thereby k=0.685 is set as the coupling coefficient k of the isolated converter transformer PIT.

Cr=4300 pF is selected as the capacitance of the primary-side parallel resonant capacitor Cr. The resonant frequency fo1=166.0 kHz of the primary side parallel resonant circuit is set by this capacitance setting of the primary-side parallel resonant capacitor Cr and the leakage inductance L1 of the primary winding N1 obtained by the structure of the isolated converter transformer PIT. C2=0.047 μF is selected as the capacitance of the secondary side parallel resonant capacitor C2. The resonant frequency fo2=109.0 kHz of the secondary side parallel resonant circuit is set by this capacitance setting of the secondary side parallel resonant capacitor C2 and the leakage inductance L2 of the secondary winding N2 obtained by the structure of the isolated converter transformer PIT. It can be said that in relative terms, there is a relation of fo1=1.5×fo2.

As for load power handled by the power supply circuit, maximum load power Pomax=200 W, and minimum load power Pomin=0 W (no load). The rated level of the secondary side direct-current output voltage Eo is 135 V.

Figure 3A:
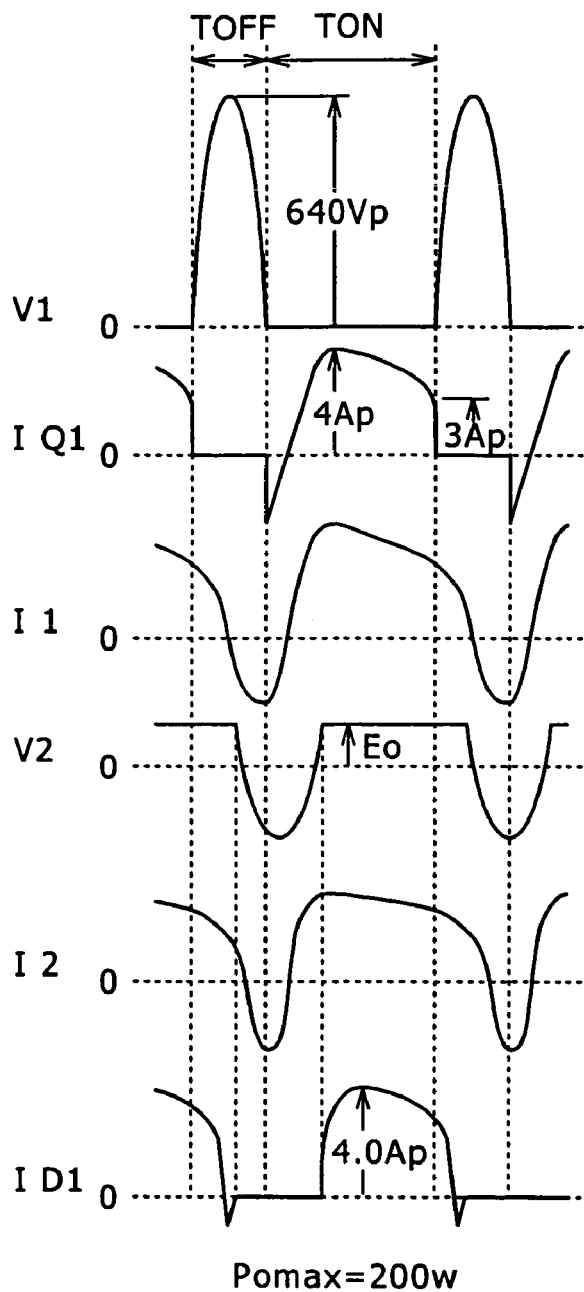
FIGS. 3A and 3B are waveform charts of the operations of principal parts in the power supply circuit according to the first embodiment on the basis of a switching cycle.
Figure 3B:
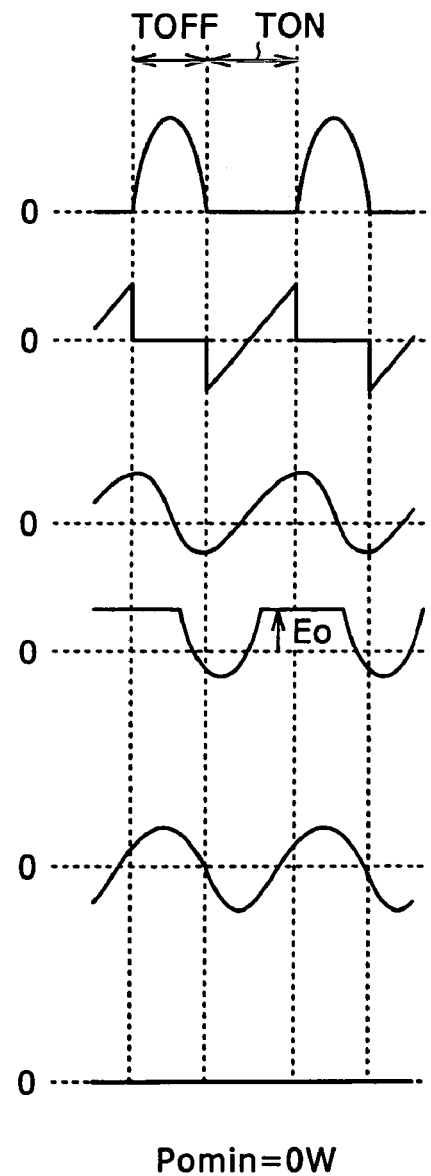

Waveform charts of FIGS. 3A and 3B show the operations of principal parts in the thus formed power supply circuit of FIG. 1 on the basis of the switching cycle of the switching device Q1. FIG. 3A shows a switching voltage V1, a switching current IQ1, a primary winding current I1, a secondary winding voltage V2, a secondary winding current I2, and a secondary side rectified current ID1 at the maximum load power Pomax=200 W. FIG. 3B shows the respective waveforms of the switching voltage V1, the switching current IQ1, the primary winding current I1, the secondary winding voltage V2, the secondary winding current I2, and the secondary side rectified current ID1 at the minimum load power Pomin=0 W.

The switching voltage V1 is the drain-to-source voltage of the switching device Q1. The switching current IQ1 is a current flowing from a drain side to the switching device Q1 (and the body diode DD). The switching voltage V1 and the switching current IQ1 indicate on/off timing of the switching device Q1. One switching cycle is divided into a period TON during which the switching device Q1 is on and a period TOFF during which the switching device Q1 is off. The switching voltage V1 is at a zero level in the period TON, and forms a resonant pulse in the period TOFF. The resonant pulse of the switching voltage V1 is obtained as a sinusoidal resonant waveform because the operation of the primary side switching converter is voltage resonant type operation.

The switching current IQ1 is at a zero level in the period TOFF. On reaching turn-on timing when the period TOFF is ended and the period TON is started, the switching current IQ1 first forms a waveform of negative polarity by flowing through the body diode DD. The switching current IQ1 is then inverted to form a waveform of positive polarity by flowing from the drain to the source. Such waveforms of the switching current IQ1 indicate that ZVS is performed properly.

The primary winding current I1 is a current flowing through the primary winding N1, and is a combination of a current component flowing through the switching device Q1 and a current flowing through the primary-side parallel resonant capacitor Cr. The waveform of the primary winding current I1 in the period TOFF corresponds to the waveform of the current flowing through the primary-side parallel resonant capacitor Cr.

As the alternating voltage is induced in the secondary winding N2, the rectifier diode Do1 conducts to pass the rectified current ID1 within a period of this conduction in each half-cycle period in which the secondary winding voltage V2 is of positive polarity and at a certain level or higher. Correspondingly, the secondary winding voltage V2 is clamped at the secondary side direct-current output voltage Eo during the period during which the voltage induced in the secondary winding N2 makes the rectifier diode Do1 conduct as a voltage having a level equal to or higher than the secondary side direct-current output voltage Eo. In a period when the rectifier diode Do1 does not conduct, the secondary winding voltage V2 forms a sinusoidal envelope having a level not higher than the secondary side direct-current output voltage Eo. The secondary winding current I2 is obtained by combining the rectified current ID1 with a current flowing through the secondary side parallel resonant capacitor C2. Incidentally, the rectified current ID1 is at a zero level even within the conduction period of the rectifier diode Do1 at the minimum load power Pomin=0 W.

A comparison of the waveforms at the maximum load power Pomax=0.200 W as shown in FIG. 3A with waveforms at the minimum load power Pomin=0 W as shown in FIG. 3B with the above-described operations of the respective parts in mind shows that the operation of the primary side switching converter shortens the period length of one switching cycle (TOFF+TON), that is, increases the switching frequency fs as a transition is made to no load. This indicates that switching frequency control operation that changes the switching frequency fs according to load variation as described above is obtained as stabilizing operation. It is also shown that in changing the switching frequency, the period TON is changed while the period TOFF is fixed.

Figure 4:
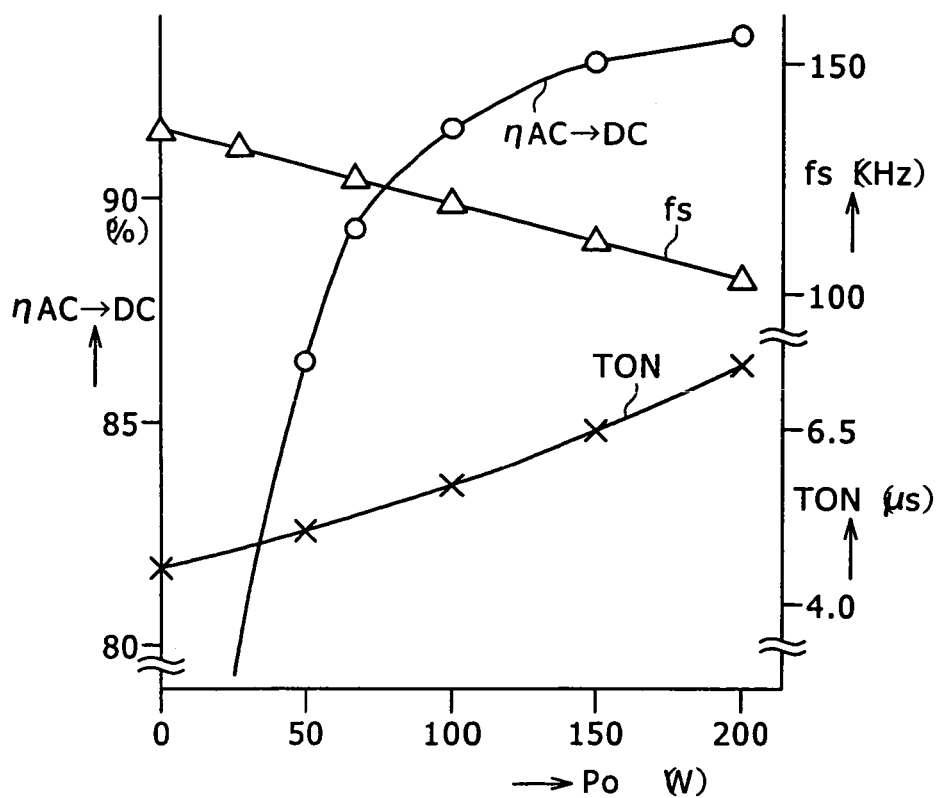
FIG. 4 is a diagram showing characteristics of variation of AC→DC power conversion efficiency, switching frequency, and the on period of a switching device with respect to load variation in the power supply circuit according to the first embodiment.
Figure 5:
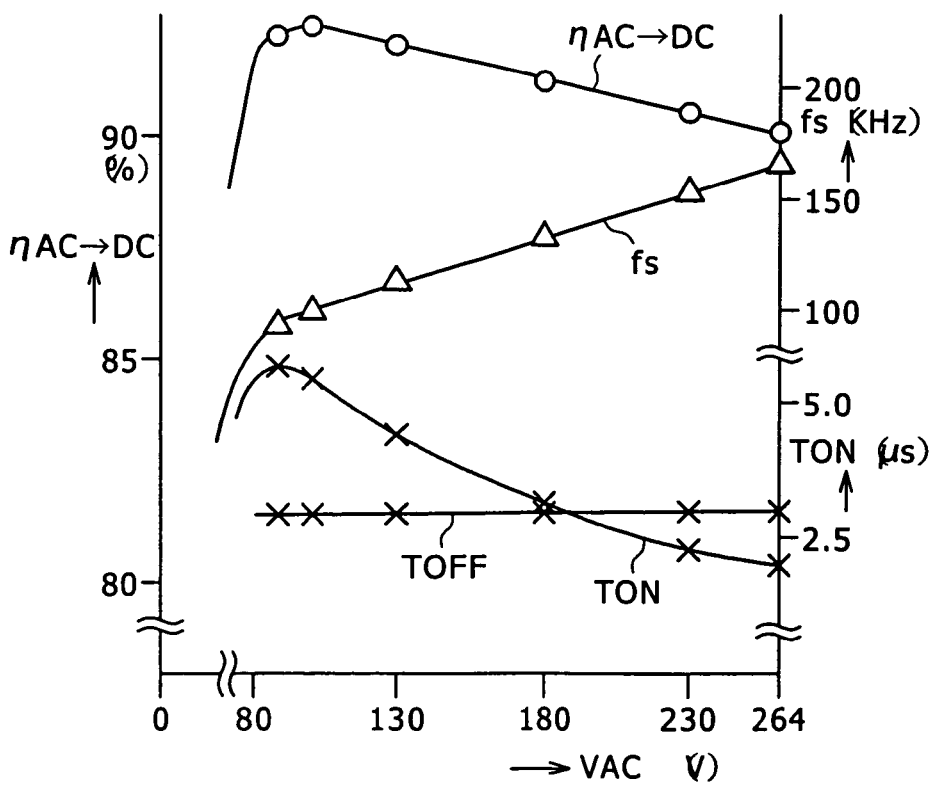
FIG. 5 is a diagram showing characteristics of variation of AC→DC power conversion efficiency, switching frequency, and the on period and the off period of the switching device with respect to variation in alternating input voltage in the power supply circuit according to the first embodiment.

FIG. 4 shows characteristics of variation of AC→DC power conversion efficiency (ηAC⊖DC), the switching frequency fs, and the time length of the period TON with respect to load variation at the alternating input voltage VAC=100 V as results of an experiment on the power supply circuit shown in FIG. 1. FIG. 5 shows characteristics of variation of the AC→DC power conversion efficiency (ηAC→DC), the switching frequency fs, and the time length of the period TON/TOFF with respect to variation in the alternating input voltage at the maximum load power Pomax 200 W.

According to these figures, the switching frequency fs is changed so as to be increased as the load becomes lighter, as described above. Also, the switching frequency fs is changed so as to be increased as the alternating input voltage VAC is raised. This indicates that the constant-voltage control operation controls the switching frequency fs so as to increase the switching frequency fs as the secondary side direct-current output voltage Eo is raised as the load becomes lighter and as the alternating input voltage is raised. The time length of the period TON is shortened as the load becomes lighter, and is shortened as the alternating input voltage is raised. On the other hand, the period TOFF is fixed irrespective of variation in the alternating input voltage. Though not shown, the period TOFF is also fixed irrespective of load variation. This indicates the operation of changing the switching frequency by changing the period TON according to load variation while the period TOFF is fixed.

As concrete values of the switching frequency fs, fs=112.4 kHz to 149.3 kHz, and Δfs=36.9 kHz in a range of the maximum load power Pomax=200 W to the minimum load power Pomin=0 W at the alternating input voltage VAC=100 V. The periods TON and TOFF corresponding to this variation of the switching frequency fs are TON=6.2 μs to 4.1 μs, and TOFF=2.7 μs (fixed).

At the alternating input voltage VAC=230 V, fs=155 kHz to 190.3 kHz, and Δfs=35.3 kHz in the range of the maximum load power Pomax 200 W to the minimum load power Pomin=0 W. The periods TON and TOFF corresponding to this variation of the switching frequency fs are TON=3.75 μs to 2.55 μs, and TOFF=2.7 μs (fixed).

The AC→DC power conversion efficiency (ηAC→DC) is increased as the load becomes heavier, and is increased as the alternating input voltage VAC is lowered.

Experimental results of ηAC→DC=93.5% at the alternating input voltage VAC=100 V and ηAC→DC=90.5% at the alternating input voltage VAC=230 V are obtained as the AC→DC power conversion efficiency (ηAC→DC) at the maximum load power Pomax=200 W.

Figure 12:
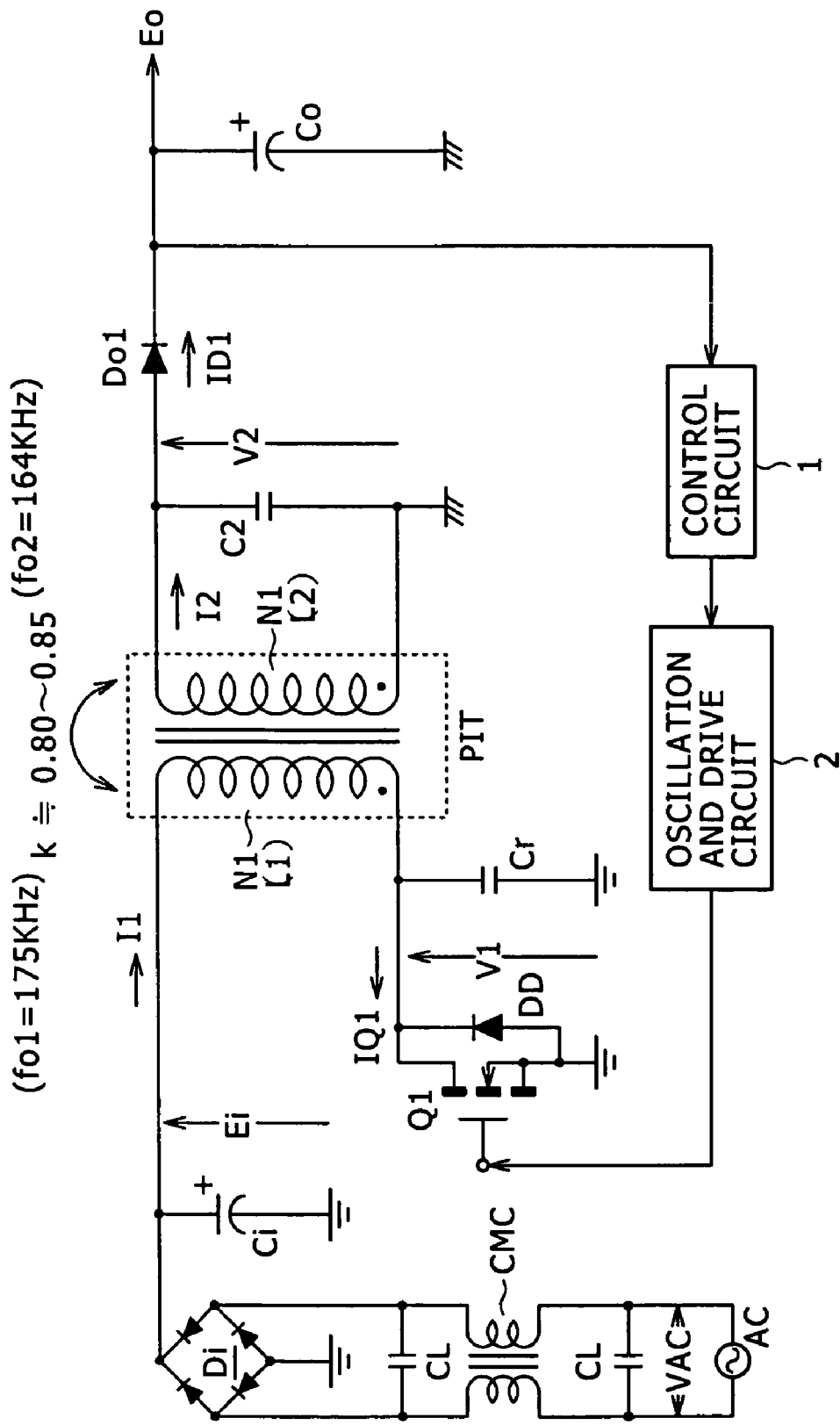
FIG. 12 is a circuit diagram showing an example of configuration of a power supply circuit according to a conventional example.

The characteristics of the switching frequency fs of the above-described power supply circuit of FIG. 1 will first be compared with the characteristics of the switching frequency fs of the power supply circuit of FIG. 12.

In the power supply circuit of FIG. 12, fs=117.6 kHz to 208.3 kHz, and Δfs=96.7 kHz in the variation range of the maximum load power Pomax=200 W to the minimum load power Pomin=0 W at the alternating input voltage VAC=100 V.

On the other hand, in the power supply circuit of FIG. 1, fs=112.4 kHz to 149.3 kHz, and Δfs=36.9 kHz in the variation range of the maximum load power Pomax=200 W to the minimum load power Pomin=0 W at the alternating input voltage VAC=100 V. It is understood that the necessary control range is greatly reduced as compared with the characteristics of the power supply circuit of FIG. 12. Further, in the power supply circuit of FIG. 1, fs=155 kHz to 190.3 kHz, and Δfs=35.3 kHz in the variation range of the maximum load power Pomax=200 W to the minimum load power Pomin=0 W at the alternating input voltage VAC=230 V. Also in this condition, the necessary control range is greatly reduced as compared with the characteristics of the power supply circuit of FIG. 12.

Such characteristics of the switching frequency fs of the power supply circuit in FIG. 1 indicate that so-called wide range capability is realized which enables stabilization while dealing with the input of the commercial alternating-current power supply in a range of an AC 100 V system to an AC 200 V system (for example VAC=85 V to 264 V) under a condition of handled load power of the maximum load power Pomax=200 W to the minimum load power Pomin=0 W. This will be described in the following.

The power supply circuit shown in FIG. 1 employs the fundamental configuration of the voltage resonant converter provided with the secondary side parallel resonant circuit. That is, it can be said that the power supply circuit shown in FIG. 1 has respective parallel resonant circuits on the primary side and the secondary side via electromagnetic induction of the isolated converter transformer PIT. As viewed from a relation between the primary side parallel resonant circuit and the secondary side parallel resonant circuit, such a configuration can be considered equivalent to a coupling type resonant circuit formed by electromagnetic coupling which circuit is supplied with a frequency signal corresponding to the switching frequency fs.

The characteristic of constant-voltage control for the secondary side direct-current output voltage Eo in the power supply circuit of FIG. 1 including such an electromagnetic coupling type resonant circuit differs according to the degree of coupling (coupling coefficient k) of the isolated converter transformer PIT. This will be described with reference to FIG. 6.

Figure 6:
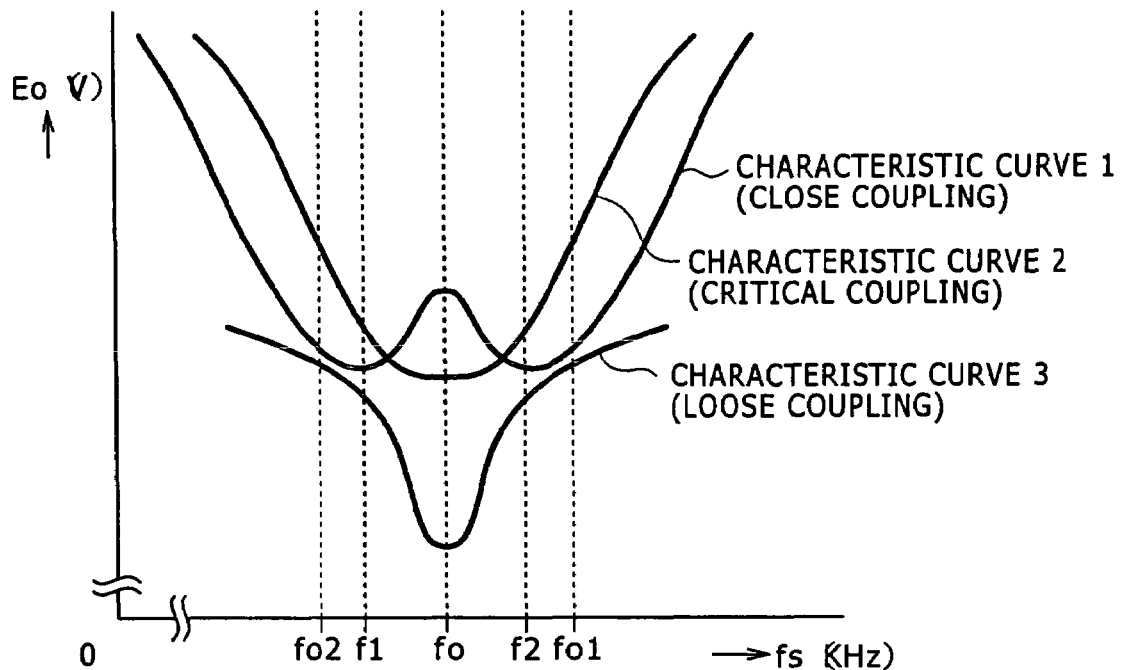
FIG. 6 is a diagram showing constant-voltage control characteristics of the power supply circuit according to the embodiment.

FIG. 6 shows characteristics of output of the above-described electromagnetic coupling type resonant circuit in response to input (switching frequency signal). That is, FIG. 6 represents characteristics of control of the secondary side direct-current output voltage Eo by relation of the secondary side direct-current output voltage Eo to the switching frequency fs. In this figure, an axis of abscissas indicates the switching frequency, and an axis of ordinates indicates the level of the secondary side direct-current output voltage Eo.

As described with reference to FIG. 1, in the first embodiment, the resonant frequency fo1 of the primary side parallel resonant circuit is set to about 1.5 times the resonant frequency fo2 of the secondary side parallel resonant circuit. Therefore the resonant frequency fo1 is higher than the resonant frequency fo2. The resonant frequencies fo1 and fo2 are shown in correspondence with each other on the axis of abscissas indicating the switching frequency in FIG. 6. Also in FIG. 6, the resonant frequency fo1 is shown to be higher than the resonant frequency fo2 in correspondence with the relation between the resonant frequencies fo1 and fo2.

Suppose that a state of close coupling at a coupling coefficient k=1 as the degree of coupling of the isolated converter transformer PIT is set. Then, the leakage inductance L1 of the primary winding N1 and the leakage inductance L2 of the secondary winding N2 in this case are each zero.

Thus, a constant-voltage control characteristic in the state of close coupling between the primary side and the secondary side of the isolated converter transformer PIT is a so-called bimodal characteristic in which the secondary side direct-current output voltage Eo peaks at frequencies f1 and f2 different from the resonant frequency fo1 of the primary side parallel resonant circuit and the resonant frequency fo2 of the secondary side parallel resonant circuit, as represented by a characteristic curve 1 in FIG. 6.

The frequency f1 is expressed by $$f1 = fo/\sqrt{1+k} \qquad \text{[Equation 1]}$$

The frequency f2 is expressed by $$f2 = fo/\sqrt{1-k} \qquad \text{[Equation 2]}$$

A term fo in the above (Equation 1) and (Equation 2) is an intermediate resonant frequency intermediate between the resonant frequency fo1 of the primary side parallel resonant circuit and the resonant frequency fo2 of the secondary side parallel resonant circuit. The frequency fo is determined by a primary side impedance and a secondary side impedance and an impedance (mutual coupling inductance M) common to the primary side and the secondary side. The mutual coupling inductance M is expressed by $$M = k\sqrt{L1 \times L2} \qquad \text{[Equation 3]}$$

When the above-described coupling coefficient k is gradually decreased from k=1, that is, when a degree of loose coupling is gradually increased from the state of close coupling, the characteristic curve 1 shown in FIG. 6 is changed such that a bimodal tendency is gradually weakened and the characteristic curve is flattened around the intermediate resonant frequency fo. Then, a state of so-called critical coupling occurs when the coupling coefficient k is decreased to a certain coupling coefficient k. In this state of critical coupling, as represented by a characteristic curve 2, the bimodal characteristic tendency disappears, and the shape of the curve is flattened around the intermediate resonant frequency fo.

When the coupling coefficient k is further decreased from the state of critical coupling to a state of looser coupling, a unimodal characteristic in which the secondary side direct-current output voltage Eo peaks only at the intermediate frequency fo is obtained, as represented by a characteristic curve 3 in FIG. 6. A comparison of the characteristic curve 3 with the characteristic curves 1 and 2 indicates that while a peak level itself of the characteristic curve 3 is lower than those of the characteristic curves 1 and 2, the characteristic curve 3 has a steeper slope as a quadratic function curve shape than the characteristic curves 1 and 2.

A state of loose coupling at the coupling coefficient k=0.7 or lower is set in the isolated converter transformer PIT according to the first embodiment. When the coupling coefficient k is thus set, operation based on the unimodal characteristic represented as the characteristic curve 3 is performed.

Figure 15:
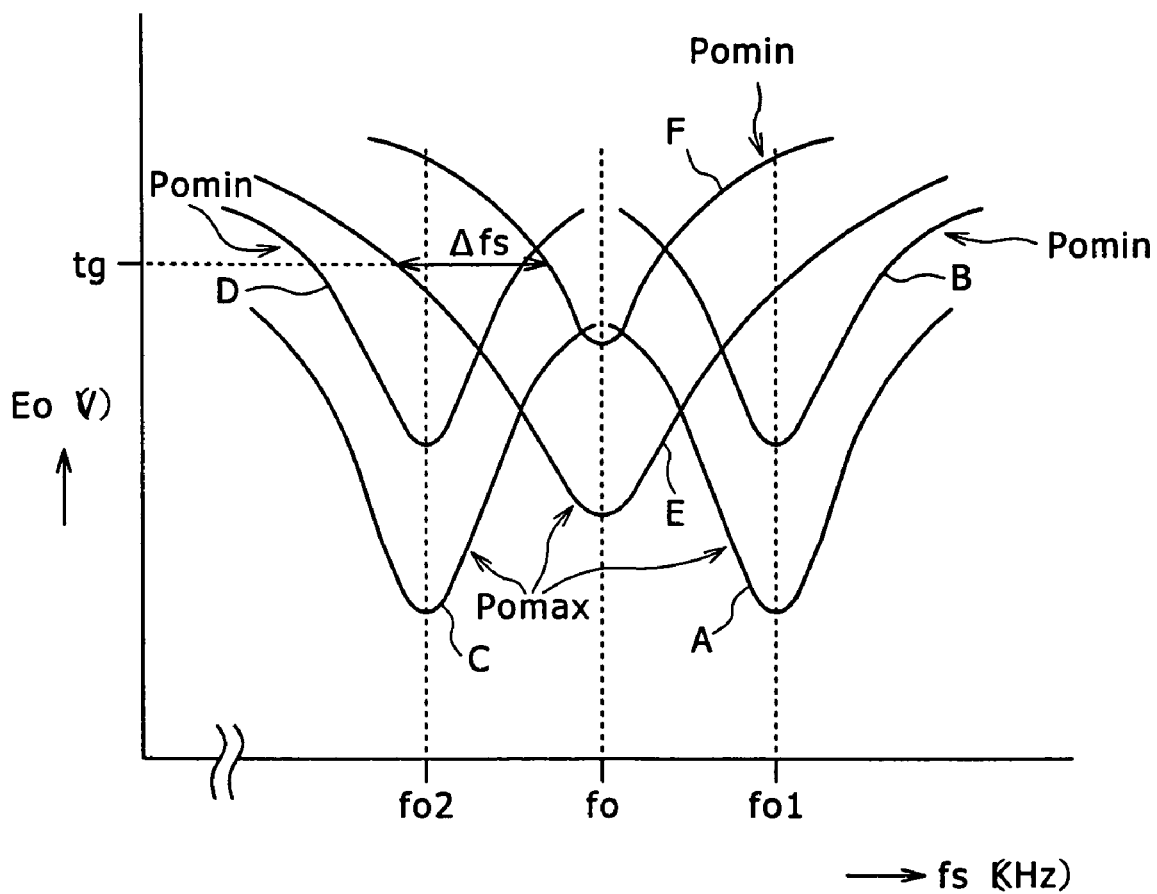
FIG. 15 is a diagram conceptually showing the constant-voltage control characteristics of the conventional power supply circuit.

An actual comparison between the unimodal characteristic shown in FIG. 6 and the constant-voltage control characteristic shown in FIG. 15 of the conventional power supply circuit shown in FIG. 12 indicates that the characteristic shown in FIG. 15 has a considerably gentler slope as a quadratic function curve as compared with the unimodal characteristic shown in FIG. 6.

Because the characteristic shown in FIG. 15 has a gentle curve as described above, the necessary control range of the switching frequency fs for performing constant-voltage control on the secondary side direct-current output voltage Eo is for example $\Delta fs$=96.7 kHz with fs=117.6 kHz to 208.3 kHz even under conditions for dealing with a single range at the alternating input voltage VAC=100 V. It is therefore very difficult to realize a wide range capability by only constant-voltage control by switching frequency control, as described above.

Figure 7:
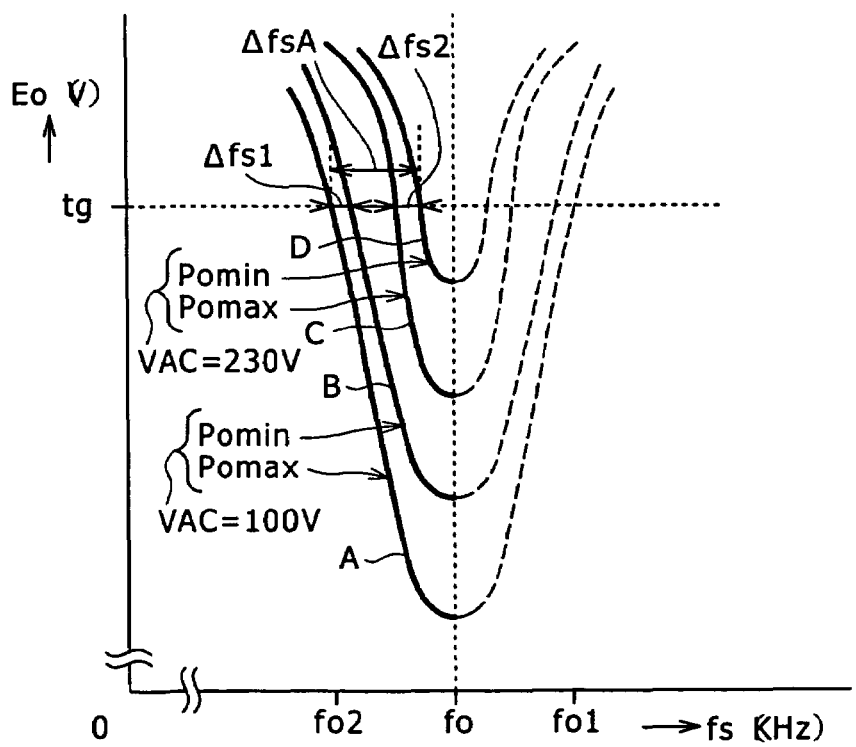
FIG. 7 is a diagram showing switching frequency control ranges (necessary control ranges) according to the condition of alternating input voltage and load variation, as constant-voltage control operation of the power supply circuit according to the embodiment.

On the other hand, the constant-voltage control characteristic of the first embodiment is the unimodal characteristic represented by the characteristic curve 3 in FIG. 6, and thus constant-voltage control operations of the first embodiment are as shown in FIG. 7.

FIG. 7 shows four characteristic curves of the power supply circuit according to the first embodiment shown in FIG. 1, that is, characteristic curves A and B at the time of maximum load power Pomax and at the time of minimum load power Pomin, respectively, when the alternating input voltage VAC=100 V (AC 100 V system) and characteristic curves C and D at the time of maximum load power Pomax and at the time of minimum load power Pomin, respectively, when the alternating input voltage VAC=230 V (AC 200 V system).

As is clear from FIG. 7, $\Delta fs1$ denotes the variable control range (necessary control range) of the switching frequency which range is necessary to hold the secondary side direct-current output voltage Eo constant at a required rated level tg when the alternating input voltage VAC=100 V corresponding to the input of the AC 100 V system. That is, the variable control range (necessary control range) of the switching frequency is a frequency range from the switching frequency fs at the level tg in the characteristic curve A to the switching frequency fs at the level tg in the characteristic curve B.

In addition, $\Delta fs2$ denotes the variable control range (necessary control range) of the switching frequency which range is necessary to hold the secondary side direct-current output voltage Eo constant at the required rated level tg when the alternating input voltage VAC=230 V corresponding to the input of the AC 200 V system. That is, the variable control range (necessary control range) of the switching frequency is a frequency range from the switching frequency fs at the level tg in the characteristic curve C to the switching frequency fs at the level tg in the characteristic curve D.

As described above, the unimodal characteristic as the characteristic of control of the secondary side direct-current output voltage Eo in the first embodiment has a considerably steeper slope as a quadratic function curve than the control characteristic shown in FIG. 15.

Therefore the above-described necessary control ranges $\Delta fs1$ and $\Delta fs2$ when the alternating input voltage VAC=100 V and 230 V are considerably reduced as compared with $\Delta fs$ shown in FIG. 15.

Thus, a frequency variable range ($\Delta fsA$) from the lowest switching frequency in $\Delta fs1$ (the switching frequency fs at the level tg in the characteristic curve A) to the highest switching frequency in $\Delta fs2$ (the switching frequency fs at the level tg in the characteristic curve D) is correspondingly narrowed.

For confirmation, $\Delta fs1$, $\Delta fs2$, and $\Delta fsA$ actually measured in the power supply circuit of FIG. 1 are $\Delta fs1$=36.9 kHz (=149.3 kHz–112.4 kHz)

$\Delta fs2$=35.3 kHz (=190.3 kHz–155 kHz)

$\Delta fsA$=77.9 kHz (=190.3 kHz–112.4 kHz)

The frequency variable range $\Delta fsA$ easily falls within the variable range of the switching frequency dealt with by a switching-driving IC (oscillation and drive circuit 2) in the present situation. That is, the power supply circuit shown in FIG. 1 can actually control the switching frequency variably in the frequency variable range $\Delta fsA$.

Thus, the power supply circuit shown in FIG. 1 can stabilize the secondary side direct-current output voltage Eo as main direct-current power properly while dealing with the commercial alternating-current power supply input of either of the AC 100 V system and the AC 200 V system. That is, the power supply circuit shown in FIG. 1 achieves a wide range capability by only switching frequency control.

Incidentally, an electromagnetic coupling type resonant circuit is already known as a technique for expanding an amplification bandwidth of an amplifier circuit formed by a transistor in communication technology as in an intermediate-frequency transformer amplifier, for example. In such a field, however, a bimodal characteristic in close coupling or a flat characteristic in critical coupling is used, but a unimodal characteristic in loose coupling is not used. It can be said that in the techniques of such an electromagnetic coupling type resonant circuit, the unimodal characteristic in loose coupling that has not been used in the field of communication technology is aggressively used in the first embodiment in a field of resonant switching converters. Thereby, as described above, the variable range (necessary control range) of the switching frequency which range is necessary to stabilize the secondary side direct-current output voltage Eo is reduced, and a wide range capability can be achieved by only constant-voltage control by switching frequency control.

Incidentally, in general, as the degree of loose coupling between the primary side and the secondary side of the isolated converter transformer PIT is increased, a power loss (eddy-current loss) in the isolated converter transformer PIT tends to increase, and power conversion efficiency is correspondingly decreased. However, the first embodiment provides a practically sufficient power conversion efficiency characteristic, as will be described later. This is because a resonant circuit (the secondary side parallel resonant circuit) is formed also on the secondary side.

That is, the secondary side parallel resonant circuit makes it possible to supply power as the secondary side direct-current output voltage Eo including an energy increase obtained by resonant operation of the secondary side parallel resonant circuit, thus compensating for the decrease in the power conversion efficiency due to loose coupling.

In addition, the substantial reduction of the necessary control range (Δfs) of the switching frequency fs for constant-voltage control under the condition of the commercial alternating-current power supply input of each of the AC 100 V system and the AC 200 V system as described above greatly improves constant-voltage control response and control sensitivity.

Some electronic devices perform operation that varies the load power Po in such a manner as to change (switch) relatively rapidly between a maximum load and no load, such a load variation being referred to as a so-called switching load. Devices that perform such a switching load operation include for example a printer as a peripheral device for a personal computer.

When a power supply circuit having a relatively wide necessary control range Δfs as shown in FIG. 15, for example, is included in a device performing such a switching load operation, the switching frequency fs is controlled to be changed by a correspondingly large amount of change following an abrupt change in load power, as described above. It is therefore difficult to obtain quick constant-voltage control response.

On the other hand, since the first embodiment greatly reduces the necessary control range Δfs in a region of each single range, in particular, the first embodiment can stabilize the secondary side direct-current output voltage Eo by quickly responding to an abrupt variation in the load power Po between a maximum load and no load. That is, the performance of constant-voltage control response to the switching load is greatly improved.

As for the power conversion efficiency characteristics described above with reference to FIG. 4 and FIG. 5, the power supply circuit of FIG. 1 has ηAC→DC=93.5% at the alternating input voltage VAC=100 V and the maximum load power Pomax=200 W. This characteristic represents an improvement of 1.2 percentage points over ηAC→DC=92.3% at the alternating input voltage VAC=100 V and the maximum load power Pomax=200 W as a characteristic of the conventional power supply circuit shown in FIG. 12, for example. Correspondingly, alternating-current input power is reduced by 2.8 W.

While compensating for decrease in the power conversion efficiency by providing the secondary side resonant circuit as described above is one factor in obtaining such favorable power conversion efficiency, the setting of the respective resonant frequencies fo1 and fo2 of the primary side parallel resonant circuit and the secondary side parallel resonant circuit is a major factor in obtaining such favorable power conversion efficiency in the first embodiment. The power conversion efficiency characteristic under the load conditions of the first embodiment as described above is ultimately obtained by adjusting the resonant frequencies fo1 and fo2. That is, the power conversion efficiency characteristic was obtained finally after experiments were performed with various settings made for the resonant frequencies fo1 and fo2, and fo1=166.0 kHz and fo2=109.0 kHz were set as described above. A comparison of the resonant frequencies fo1 and fo2 of the first embodiment with the conventional resonant frequencies fo1 and fo2 shows that while the resonant frequencies fo1 and fo2 of the power supply circuit shown in FIG. 12 are fo1=175.0 kHz and fo2=164.0 kHz and thus have a similar relation of fo1>fo2, the values of the respective frequencies and a frequency difference between the frequencies are different from those of the first embodiment. The respective frequency values of the resonant frequencies fo1 and fo2 of the first embodiment are reduced as compared with the conventional resonant frequencies fo1 and fo2, and a frequency difference between the resonant frequencies fo1 and fo2 of the first embodiment is greatly increased.

One reason for the improvement of the power conversion efficiency by setting the resonant frequencies fo1 and fo2 as described above is as follows. As is understood from a comparison of the switching current IQ1 in FIG. 3A with the switching current IQ1 in FIG. 13A, the waveform of the switching current IQ1 in FIG. 3A corresponding to the first embodiment has a peak level of 4 Ap before turn-off timing in which timing the period TON of the switching device Q1 is ended and a transition is made to the period TOFF. The level is decreased to 3 Ap when the turn-off timing is reached.

The waveform of such a switching current IQ1 is affected by the waveform of the secondary winding current I2. That is, the waveform of the switching current IQ1 has a waveform component corresponding to the current flowing through the secondary side parallel resonant circuit. The waveform of the secondary winding current I2 is determined by the setting of the resonant frequency fo2 in relation to the resonant frequency fo1.

Thus, the waveform of the switching current IQ1 in the power supply circuit shown in FIG. 1 is obtained by the appropriate setting of the respective resonant frequencies fo1 and fo2 of the primary side parallel resonant circuit and the secondary side parallel resonant circuit.

The waveform of the switching current IQ1 shown in FIG. 3A indicates that the level of the switching current IQ1 at the turn-off time is suppressed. When the level of the switching current IQ1 at the turn-off time is suppressed, a switching loss and a conduction loss at the turn-off time are correspondingly reduced.

Figure 13A:
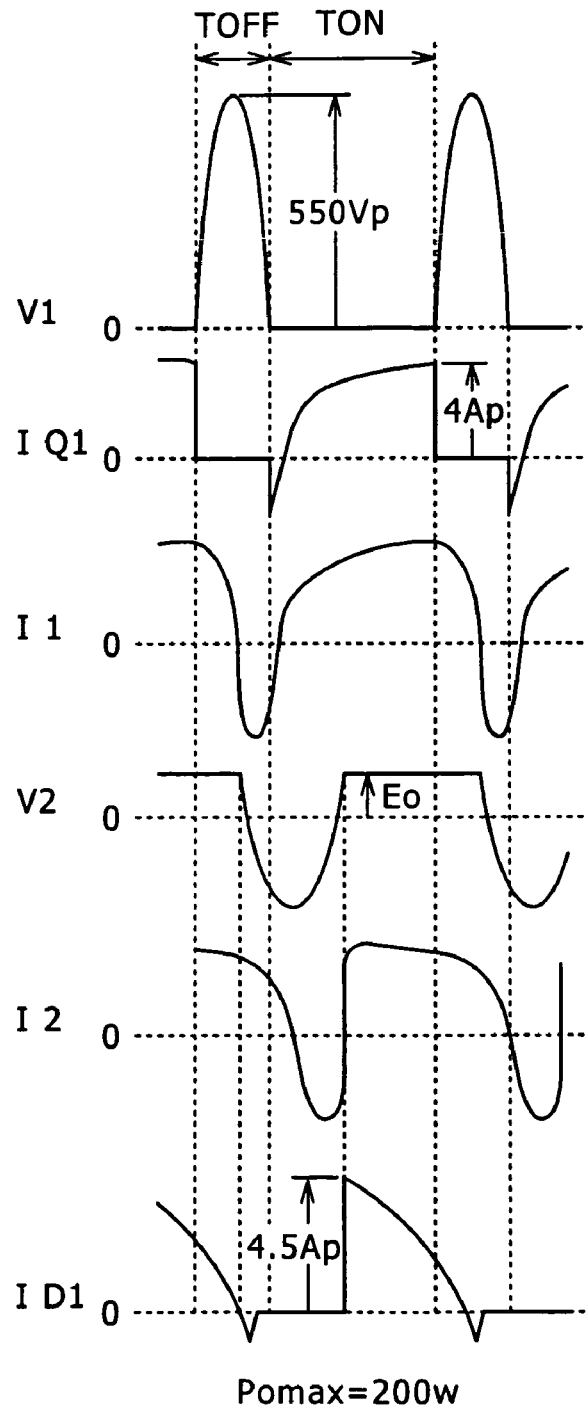
FIGS. 13A and 13B are waveform charts of the operations of principal parts in the power supply circuit shown in FIG. 12.
Figure 13B:
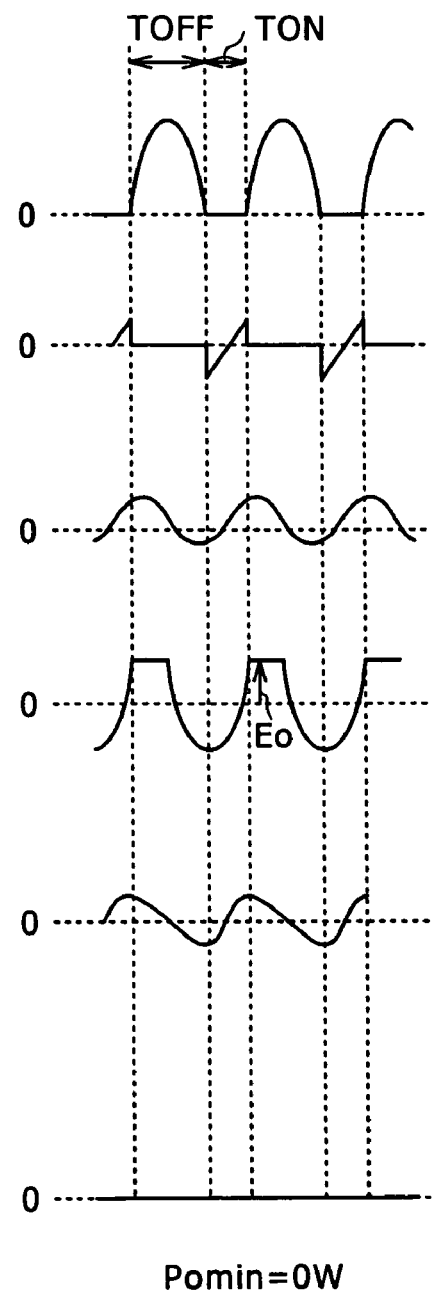
Figure 14:
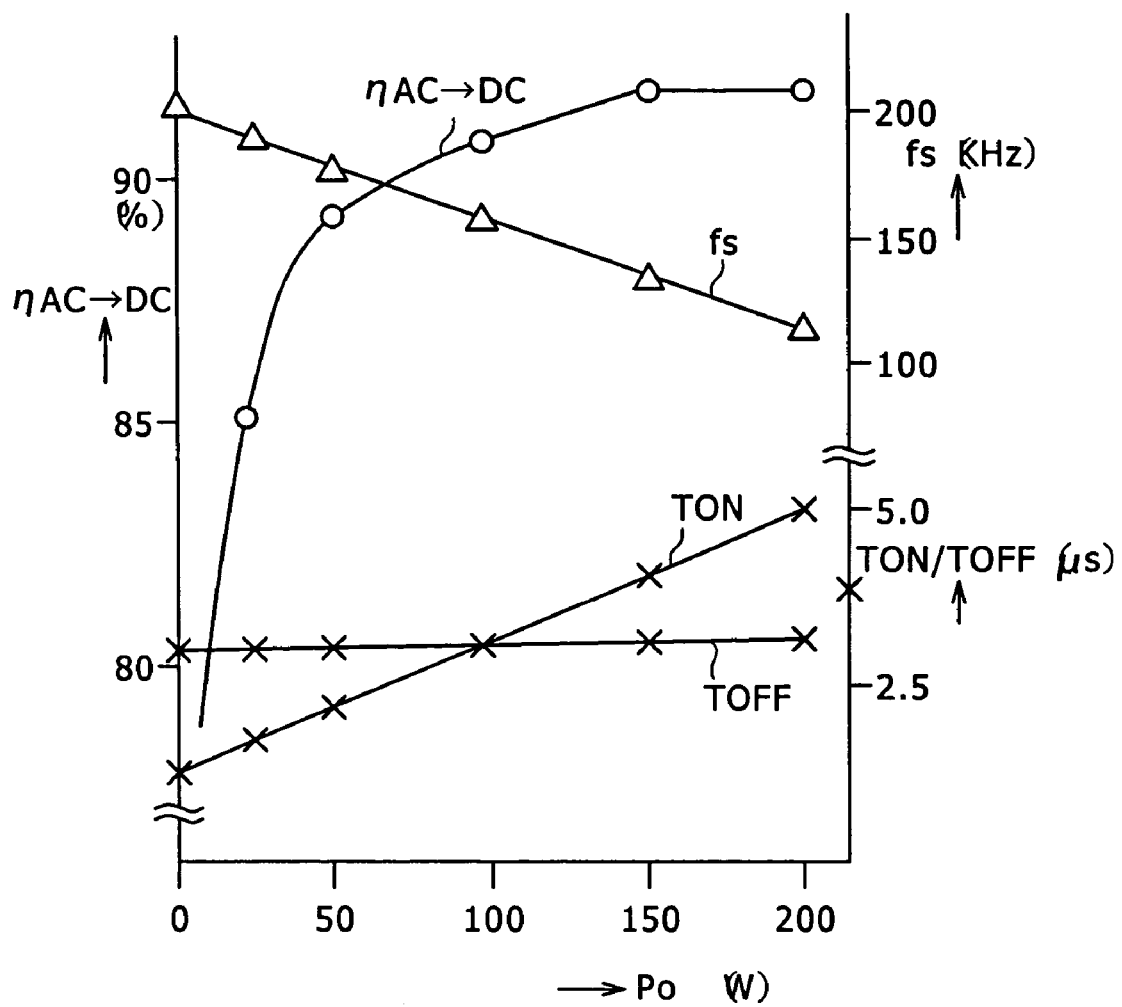
FIG. 14 is a diagram showing characteristics of variation of AC→DC power conversion efficiency, switching frequency, and the on period and the off period of a switching device with respect to load variation in the power supply circuit shown in FIG. 12.

In the power supply circuit according to the first embodiment, the secondary side rectified current ID1 also has a level suppressed at the turn-off time as shown in FIG. 3A in correspondence with the decrease from the peak level in the waveform of the switching current IQ1 at the turn-off time, as described above. Incidentally, the switching current IQ1 in the conventional power supply circuit has a peak level at the turn-off time, as shown in FIG. 13A. Thus, a switching loss and a conduction loss in the rectifier diode Do1 are also reduced.

Such reductions of the switching loss and the conduction loss in the switching device and the rectifying element are a main factor in obtaining a high power conversion efficiency characteristic in the power supply circuit according to the first embodiment.

Variations of the secondary side rectifier circuit are shown in FIGS. 8 to 11 as other embodiments of the power supply circuit according to the present invention.

Figure 8:
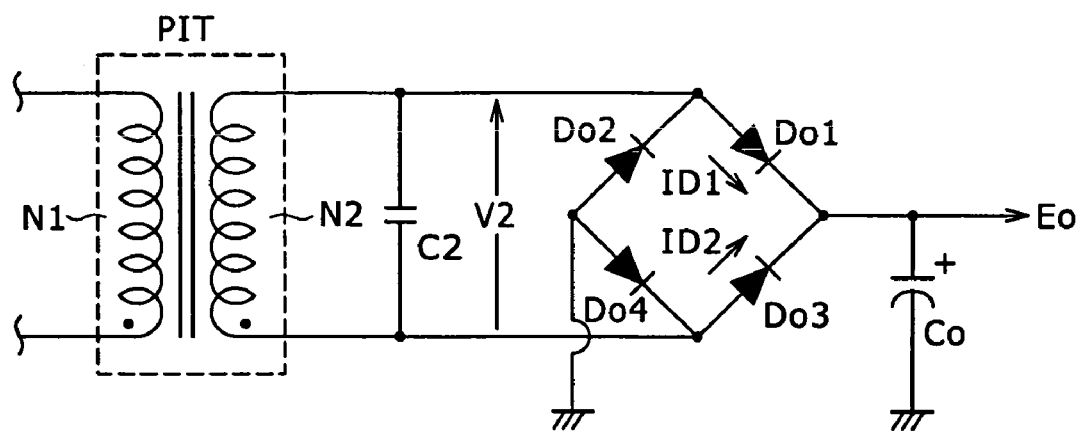
FIG. 8 is a circuit diagram showing an example of configuration of a power supply circuit according to a second embodiment of the present invention.

FIG. 8 shows a configuration of a power supply circuit according to a second embodiment of the present invention.

Incidentally, only an isolated converter transformer PIT and a secondary side rectifier circuit are shown in this figure. Parts other than the isolated converter transformer PIT and the secondary side rectifier circuit are the same as in FIG. 1, and are not shown in FIG. 8. In FIG. 8, the same parts as in FIG. 1 are identified by the same reference numerals, and description thereof will be omitted. This is true for FIGS. 9 to 11 to be described later.

Also in the power supply circuit shown in FIG. 8, a secondary side parallel resonant circuit is formed by connecting a secondary side parallel resonant capacitor C2 in parallel with a secondary winding N2. In addition, a bridge full-wave rectifier circuit is provided as a secondary side rectifier circuit. This bridge full-wave rectifier circuit is formed by connecting a bridge rectifier circuit formed by four rectifier diodes Do1, Do2, Do3, and Do4 to a smoothing capacitor Co as shown in the figure.

The thus formed bridge full-wave rectifier circuit alternately performs an operation in which the rectifier diodes Do1 and Do4 conduct to charge the smoothing capacitor Co and an operation in which the rectifier diodes Do2 and Do3 conduct to charge the smoothing capacitor Co in respective half cycles of a voltage induced in the secondary winding N2. Thereby a secondary side direct-current output voltage Eo having a level corresponding to once the level of the voltage induced in the secondary winding N2 is obtained as a voltage across the smoothing capacitor Co.

Principal parts of the power supply circuit according to the second embodiment are selected as follows. Incidentally, as for load power handled by the power supply circuit, maximum load power Pomax=200 W and minimum load power Pomin=0 W (no load), and the rated level of the secondary side direct-current output voltage Eo is 135 V, as in the power supply circuit of FIG. 1.

For the isolated converter transformer PIT, an EER-35 core is selected, and a gap G is set to a gap length of 2 mm. As for the number T of turns of a primary winding N1, N1=37 T. As for the number T of turns of the secondary winding N2, N2=25 T. A voltage induced per turn of the secondary winding N2 is 5.4 V/T. Thereby k=0.685 is set as the coupling coefficient k of the isolated converter transformer PIT.

Cr=3900 pF is selected as the capacitance of a primary-side parallel resonant capacitor Cr. The resonant frequency fo1 of a primary side parallel resonant circuit is set to fo1=174.3 kHz by this capacitance setting of the primary-side parallel resonant capacitor Cr and the leakage inductance L1 of the primary winding N1 obtained by the structure of the isolated converter transformer PIT. C2=0.047 μF is selected as the capacitance of the secondary side parallel resonant capacitor C2. The resonant frequency fo2 of the secondary side parallel resonant circuit is set to fo2=109.0 kHz by this capacitance setting of the secondary side parallel resonant capacitor C2 and the leakage inductance L2 of the secondary winding N2 obtained by the structure of the isolated converter transformer PIT.

Experiments conducted on the thus formed power supply circuit according to the second embodiment show that as operation waveforms of the principal parts, substantially the same results as in the waveform charts of FIGS. 3A to 3C are obtained, and that a switching current IQ1 at heavy load has a peak level suppressed at a turn-off time. However, the secondary side rectifier circuit in this case performs full-wave rectifier operation. Thus, in a half cycle of one polarity of a secondary winding voltage V2, a rectified current ID1 flows to the smoothing capacitor Co according to rectifying operation of the rectifier diodes Do1 and Do4, and in a half cycle of another polarity of the secondary winding voltage V2, a rectified current ID2 flows to the smoothing capacitor Co according to rectifying operation of the rectifier diodes Do2 and Do3. In correspondence with the rectified currents thus flowing in the double-wave period, the positive and negative peak levels of the secondary winding voltage V2 are both clamped at the level of the secondary side direct-current output voltage Eo.

As for characteristics of switching frequency fs and periods TON and TOFF representing constant-voltage control characteristics, results obtained show that fs=100.0 kHz to 135.1 kHz, Δfs=35.1 kHz, TON=6.6 μs to 4.5 μs, and TOFF=3.4 μs to 2.9 μs with the commercial alternating-current power supply input of an alternating input voltage VAC=100 V corresponding to an AC 100 V system with respect to load variation from maximum load power Pomax=200 W to minimum load power Pomin=0 W. Also, results obtained show that fs=145 kHz to 179.1 kHz, Δfs=34.1 kHz, TON=3.6 μs to 2.1 μs, and TOFF=3.3 μs to 2.5 μs with the commercial alternating-current power supply input of an alternating input voltage VAC=230 V corresponding to an AC 200 V system with respect to the load variation from the maximum load power Pomax=200 W to the minimum load power Pomin=0 W. ΔfsA is 79.1 kHz (=179.1 kHz−100.0 kHz).

Such characteristics indicate that the second embodiment also achieves a wide range capability by only switching frequency control.

As for AC→DC power conversion efficiency (ηAC→DC), ηAC→DC=93.9% at the alternating input voltage VAC=100 V and the maximum load power Pomax=200 W. This represents an improvement of 1.6 percentage points over the power conversion efficiency of the conventional power supply circuit. Alternating-current input power is reduced by 3.7 W. At the alternating input voltage VAC=230 V and the maximum load power Pomax=200 W, ηAC→DC=90.9%.

Figure 9:
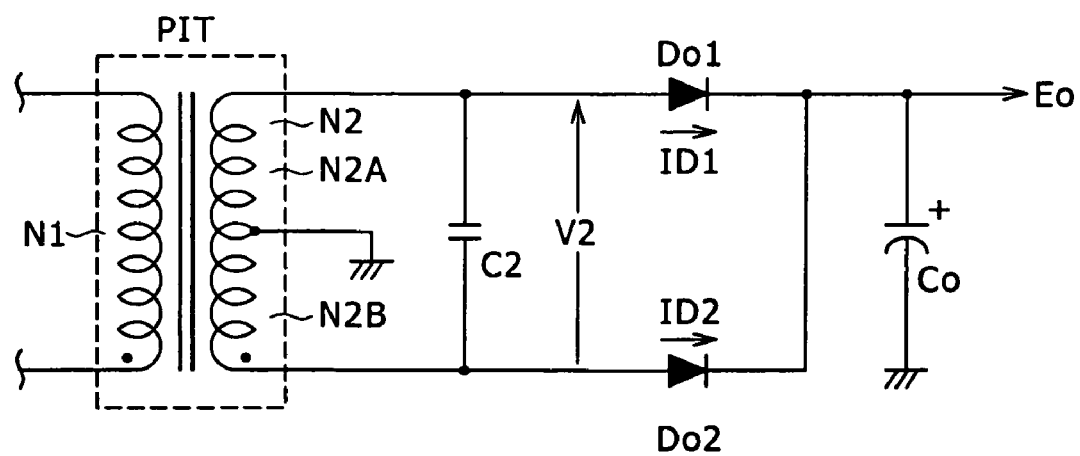
FIG. 9 is a circuit diagram showing an example of configuration of a power supply circuit according to a third embodiment of the present invention.

FIG. 9 shows a configuration of a third embodiment.

The third embodiment has a double-wave rectifier circuit as a secondary side rectifier circuit.

In order to form the double-wave rectifier circuit, a secondary winding N2 is provided with a center tap to be divided into secondary winding parts N2A and N2B with the center tap as a boundary. The center tap is connected to a secondary side ground.

A secondary side parallel resonant capacitor C2 for forming a secondary side parallel resonant circuit in this case is connected in parallel with the whole of the secondary winding N2.

In addition, two rectifier diodes Do1 and Do2 and one smoothing capacitor Co are provided as parts or elements forming the secondary side rectifier circuit in this case. The anode of the rectifier diode Do1 is connected to an end part on the secondary winding part N2A side of the secondary winding N2. The anode of the rectifier diode Do2 is connected to an end part on the secondary winding part N2B side of the secondary winding N2. The cathodes of the rectifier diodes Do1 and Do2 are both connected to the positive electrode terminal of the smoothing capacitor Co. The negative electrode terminal of the smoothing capacitor Co is connected to the secondary side ground.

In the thus formed secondary side double-wave rectifier circuit, in a half cycle of one polarity of a secondary winding voltage V2 induced in the secondary winding N2, a rectified current ID1 flows through a path from the secondary winding part N2A to the rectifier diode Do1 to the smoothing capacitor Co to charge the smoothing capacitor Co. In a half cycle of another polarity of the secondary winding voltage V2 induced in the secondary winding N2, a rectified current ID2 flows through a path from the secondary winding part N2B to the rectifier diode Do2 to the smoothing capacitor Co to charge the smoothing capacitor Co. Thus, full-wave rectifier operation is performed in which the smoothing capacitor Co is charged with the rectified current in the period of each of the positive and negative half cycles of the secondary winding voltage V2. Thereby a secondary side direct-current output voltage Eo having a level corresponding to once the level of the voltage induced in the secondary winding N2 is obtained as a voltage across the smoothing capacitor Co.

The thus formed power supply circuit according to the third embodiment is formed by selecting substantially the same principal parts as in the second embodiment, for example, so that the coupling coefficient k of an isolated converter transformer PIT is k=0.7 or lower. Thereby a wide range capability is realized by only switching frequency control. The resonant frequency fo1 of a primary side parallel resonant circuit and the resonant frequency fo2 of the secondary side parallel resonant circuit are set so as to obtain a certain value or higher as AC→DC power conversion efficiency. As a result, as in the foregoing embodiments, the waveform of a switching current IQ1 at heavy load has a peak level suppressed at a time of turning off a switching device Q1.

Figure 10:
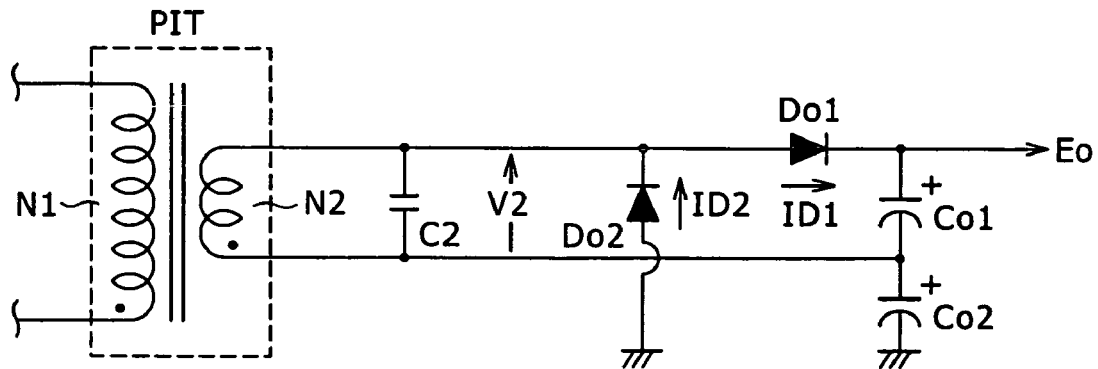
FIG. 10 is a circuit diagram showing an example of configuration of a power supply circuit according to a fourth embodiment of the present invention.

FIG. 10 shows an example of configuration of a power supply circuit according to a fourth embodiment.

The power supply circuit shown in FIG. 10 has a voltage doubler rectifier circuit as a secondary side rectifier circuit. The voltage doubler rectifier circuit is formed by connecting two rectifier diodes Do1 and Do2 and two smoothing capacitors Co1 and Co2 to a parallel connection circuit of a secondary winding N2 and a secondary side parallel resonant capacitor C2 as shown in FIG. 10.

In this case, the anode of the rectifier diode Do1 and the cathode of the rectifier diode Do2 are connected to the winding termination end part of the secondary winding N2. The cathode of the rectifier diode Do1 is connected to the positive electrode terminal of the smoothing capacitor Co1.

The smoothing capacitors Co1 and Co2 are connected in series with each other such that the negative electrode terminal of the smoothing capacitor Co1 is connected to the positive electrode terminal of the smoothing capacitor Co2. The winding start end part of the secondary winding N2 is connected to a point of connection between the smoothing capacitors Co1 and Co2.

The negative electrode terminal of the smoothing capacitor Co2 and the anode of the rectifier diode Do2 are connected to a secondary side ground.

In the thus formed secondary side voltage doubler rectifier circuit, in a half cycle of one polarity of a secondary winding voltage V2, a rectified current flows through a path from the secondary winding N2 to the rectifier diode Do1 to the smoothing capacitor Co1 to charge the smoothing capacitor Co1. In a half cycle of another polarity of the secondary winding voltage V2, a rectified current flows through a path from the secondary winding N2 to the rectifier diode Do2 to the smoothing capacitor Co2 to charge the smoothing capacitor Co2. Thus, the charging of the smoothing capacitor Co1 and the charging of the smoothing capacitor Co2 are alternately performed in the positive and negative half cycles of the secondary winding voltage V2. A potential corresponding to once the level of the voltage induced in the secondary winding N2 is obtained at each of the smoothing capacitors Co1 and Co2. Thereby a secondary side direct-current output voltage Eo having a level corresponding to once the level of the voltage induced in the secondary winding N2 is obtained as a voltage across the series connection circuit of the smoothing capacitors Co1 and Co2.

Principal parts of the power supply circuit according to the fourth embodiment are selected as follows.

Also in this power supply circuit, as for load power handled by the power supply circuit, maximum load power Pomax=200 W and minimum load power Pomin=0 W (no load), and the rated level of the secondary side direct-current output voltage Eo is 135 V, as in the power supply circuit of FIG. 1.

For an isolated converter transformer PIT, an EER-35 core is selected, and a gap G is set to a gap length of 2 mm. As for the number T of turns of a primary winding N1, N1=63 T. As for the number T of turns of the secondary winding N2, N2=13 T. A voltage induced per turn of the secondary winding N2 is 5.4 V/T. Thereby k=0.675 is set as the coupling coefficient k of the isolated converter transformer PIT.

Cr=3900 pF is selected as the capacitance of a primary-side parallel resonant capacitor Cr. The resonant frequency fo1 of a primary side parallel resonant circuit is set to fo1=174.3 kHz by this capacitance setting of the primary-side parallel resonant capacitor Cr and the leakage inductance L1 of the primary winding N1 obtained by the structure of the isolated converter transformer PIT. C2=0.18 μF is selected as the capacitance of the secondary side parallel resonant capacitor C2. The resonant frequency fo2 of the secondary side parallel resonant circuit is set to fo2=110.0 kHz by this capacitance setting of the secondary side parallel resonant capacitor C2 and the leakage inductance L2 of the secondary winding N2 obtained by the structure of the isolated converter transformer PIT.

Results of experiments conducted on the thus formed power supply circuit according to the fourth embodiment show that the operation waveforms of the principal parts of the power supply circuit according to the fourth embodiment are substantially the same as in the waveform charts of FIGS. 3A to 3C, and that a switching current IQ1 at heavy load has a peak level suppressed at a turn-off time.

As for characteristics of switching frequency fs and periods TON and TOFF representing constant-voltage control characteristics, results obtained show that fs=98.5 kHz to 132.1 kHz, Δfs=35.6 kHz, TON=6.9 μs to 4.8 μs, and TOFF=3.3 μs to 2.8 μs with the commercial alternating-current power supply input of an alternating input voltage VAC=100 V corresponding to an AC 100 V system with respect to load variation from maximum load power Pomax=200 W to minimum load power Pomin=0 W. Also, results obtained show that fs=141 kHz to 173.5 kHz, Δfs=32.5 kHz, TON=4.7 μs to 3.3 μs, and TOFF=3.0 μs to 2.5 μs with the commercial alternating-current power supply input of an alternating input voltage VAC=230 V corresponding to an AC 200 V system with respect to the load variation from the maximum load power Pomax=200 W to the minimum load power Pomin=0 W. ΔfsA is 75 kHz (=173.5 kHz−98.5 kHz).

Since such characteristics are obtained, the fourth embodiment also achieves a wide range capability by only switching frequency control.

As for AC→DC power conversion efficiency (ηAC→DC), ηAC→DC=93.1% at the alternating input voltage VAC=100 V and the maximum load power Pomax=200 W. This represents an improvement of 0.8 percentage points over the power conversion efficiency of the conventional power supply circuit. Alternating-current input power is reduced by 1.9 W. At the alternating input voltage VAC=230 V and the maximum load power Pomax=200 W, ηAC→DC=90.2%.

Figure 11:
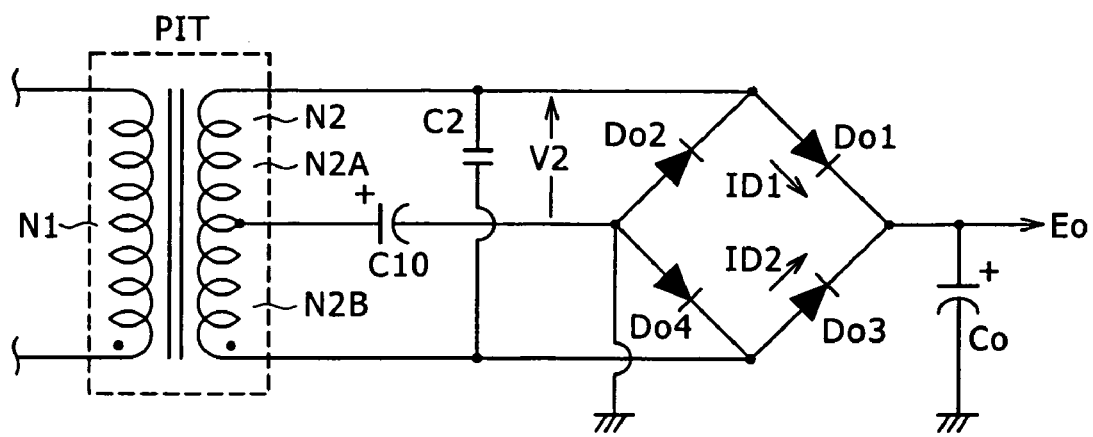
FIG. 11 is a circuit diagram showing an example of configuration of a power supply circuit according to a fifth embodiment of the present invention.

FIG. 11 shows an example of configuration of a power supply circuit according to a fifth embodiment.

The secondary side rectifier circuit of the power supply circuit shown in FIG. 11 is formed as a voltage doubler full-wave rectifier circuit.

A secondary winding N2 in this case is provided with a center tap to be divided into secondary winding parts N2A and N2B with the center tap as a boundary. The secondary winding parts N2A and N2B have the same number of turns.

A secondary side parallel resonant capacitor C2 for forming a secondary side parallel resonant circuit is connected in parallel with the whole of the secondary winding N2. In addition, rectifier diodes Do1, Do2, Do3, and Do4, a capacitor C10, and a smoothing capacitor Co are connected to the secondary winding N2 as follows.

An end part on the secondary winding part N2A side of the secondary winding N2 is connected to a point of connection between the anode of the rectifier diode Do1 and the cathode of the rectifier diode Do2. An end part on the secondary winding part N2B side of the secondary winding N2 is connected to a point of connection between the anode of the rectifier diode Do3 and the cathode of the rectifier diode Do4.

The center tap of the secondary winding N2 is connected to the positive electrode terminal of the capacitor C10. The negative electrode terminal of the capacitor C10 is connected to a point of connection between the respective anodes of the rectifier diodes Do1 and Do3 as well as a secondary side ground. The cathodes of the rectifier diodes Do1 and Do3 are connected to the positive electrode terminal of the smoothing capacitor Co. The negative electrode terminal of the smoothing capacitor Co is connected to the secondary side ground.

The thus formed voltage doubler full-wave rectifier circuit can be considered to be a combination of a first voltage doubler half-wave rectifier circuit including the secondary winding part N2A, the rectifier diodes Do1 and Do2, the capacitor C10, and the smoothing capacitor Co and a second voltage doubler half-wave rectifier circuit including the secondary winding part N2B, the rectifier diodes Do3 and Do4, the capacitor C10, and the smoothing capacitor Co. The first voltage doubler half-wave rectifier circuit and the second voltage doubler half-wave rectifier circuit in this case share the capacitor C10 and the smoothing capacitor Co.

In a half-wave period in which a secondary winding voltage V2 is of negative polarity at the end part on the secondary winding part N2A side, the first voltage doubler half-wave rectifier circuit passes a rectified current through a path from the secondary winding part N2A to the capacitor C10 to the rectifier diode Do2 to the secondary winding part N2A to charge the capacitor C10. The first voltage doubler half-wave rectifier circuit thereby generates a potential corresponding to once the level of the voltage induced in the secondary winding part N2A as a voltage across the capacitor C10. Then, in a next half-wave period in which the secondary winding voltage V2 is of positive polarity at the end part on the secondary winding part N2A side, the first voltage doubler half-wave rectifier circuit passes a rectified current through a path from the secondary winding part N2A to the rectifier diode Do1 to the smoothing capacitor Co to the capacitor C10 to the secondary winding part N2B. At this time, the smoothing capacitor Co is charged by a potential obtained by superimposing the voltage across the capacitor C10 on the potential (V2) of the secondary winding part N2A.

The second voltage doubler half-wave rectifier circuit passes a rectified current through a path from the secondary winding part N2B to the capacitor C10 to the rectifier diode Do4 to the secondary winding part N2B to charge the capacitor C10 in the half-wave period in which the secondary winding voltage V2 is of negative polarity at the end part on the secondary winding part N2B side. Then, in the next half-wave period in which the secondary winding voltage V2 is of positive polarity at the end part on the secondary winding part N2B side, the second voltage doubler half-wave rectifier circuit passes a rectified current through a path from the secondary winding part N2B to the rectifier diode Do3 to the smoothing capacitor Co to the capacitor C10 to the secondary winding part N2B. Thereby the smoothing capacitor Co is charged by a potential obtained by superimposing the voltage across the capacitor C10 on the potential (equal to V2) of the secondary winding part N2B.

As a result of such an operation, the charging of the smoothing capacitor Co by the superimposed potential of the secondary winding part N2A and the capacitor C10 and the charging of the smoothing capacitor Co by the superimposed potential of the secondary winding part N2B and the capacitor C10 are alternately performed in the positive and negative half cycles of the secondary winding voltage V2. Thereby a secondary side direct-current output voltage Eo as a rectified and smoothed voltage having a level corresponding to twice the level of the voltage induced in the secondary winding part N2A or N2B is obtained as a voltage across the smoothing capacitor Co.

The thus formed power supply circuit according to the fifth embodiment is formed by selecting substantially the same principal parts as in the fourth embodiment, for example, so that the coupling coefficient k of an isolated converter transformer PIT is set to k=0.7 or lower. Thereby a wide range capability is realized by only switching frequency control. The resonant frequency fo1 of a primary side parallel resonant circuit and the resonant frequency fo2 of the secondary side parallel resonant circuit are set so as to obtain a certain value or higher as AC→DC power conversion efficiency. As a result, as in the foregoing embodiments, the waveform of a switching current IQ1 at heavy load has a peak level suppressed at a time of turning off a switching device Q1.

It is to be noted that the present invention is not limited to the configurations shown as the foregoing embodiments. For example, different configurations are conceivable for details of the circuit configuration of the primary side voltage resonant converter and the configuration of the secondary side rectifier circuit including the secondary side parallel resonant circuit.

In addition, a device other than a MOS-FET may be selected as the switching device. Further, while the foregoing embodiments include an externally excited switching converter, the present invention is applicable to cases where the switching converter is formed as a self-excited switching converter.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit, comprising:
   primary side rectifying and smoothing means for obtaining a direct-current input voltage by rectifying and smoothing an alternating input voltage;
   switching means formed with a switching device supplied with the direct-current input voltage and operable to perform a switching operation;
   switching-driving means for switching-driving said switching device;
   an isolated converter transformer having an EE type core formed of at least two E-shaped cores of ferrite material arranged to face each other such that each leg of a first E-shaped core has an end that faces an end of a corresponding leg of a second E-shaped core, the end of a central leg of said first E-shaped core and the end of a central leg of said second E-shaped core being spaced apart from each other, a primary winding wound around a central leg of said first E-shaped core and being supplied with a switching output obtained by the switching operation of said switching means, and a secondary winding wound around a central leg of said second E-shaped core and in which an alternating voltage is induced by the switching output obtained in said primary winding;
   a primary side parallel resonant circuit formed of at least a leakage inductance component of said primary winding of said isolated converter transformer and a capacitance of a primary side parallel resonant capacitor, said primary side parallel resonant circuit causing said switching means to have a voltage resonant type operation;

a secondary side parallel resonant circuit formed of a leakage inductance component of said secondary winding of said isolated converter transformer and a capacitance of a secondary side parallel resonant capacitor connected in parallel with said secondary winding;

secondary side direct-current output voltage generating means for generating a secondary side direct-current output voltage, including:

means for rectifying the alternating voltage induced in said secondary winding of said isolated converter transformer to provide a rectified voltage, and means for smoothing the rectified voltage using a secondary side smoothing capacitor; and constant-voltage control means for substantially stabilizing the secondary side direct-current output voltage by varying switching frequency of said switching means by controlling said switching-driving means according to a secondary side direct-current output voltage level;

the width of the space between the end of said central leg of said first E-shaped core and the end of said central leg of said second E-shaped core, the number of turns of said primary winding, the number of turns of said secondary winding, the capacitance of the primary side parallel resonant capacitor, and the capacitance of the secondary side parallel resonant capacitor each being selected to provide a coupling coefficient between a primary side and a secondary side of said isolated converter transformer of about 0.7 or lower and a resonant frequency of said primary side parallel resonant circuit of about 1.5 times a resonant frequency of said secondary side parallel resonant circuit so that a curve showing the secondary side direct-current output voltage level of said switching power supply circuit as a function of said switching frequency has a unimodal characteristic and has a narrower necessary control range of switching frequency than a necessary control range of switching frequency for an analogous further switching power supply circuit in which a width of a space between an end of a central leg of a first E-shaped core and an end of a central leg of a second E-shaped core, a number of turns of a primary winding, a number of turns of a secondary winding, a capacitance of a primary side parallel resonant capacitor, and a capacitance of a secondary side parallel resonant capacitor are each selected to provide a coupling coefficient between a primary side and a secondary side of an isolated converter transformer of about 0.81 and a resonant frequency of a primary side parallel resonant circuit of about 1.07 times a resonant frequency of a secondary side parallel resonant circuit, the necessary control range of switching frequency being a range between a lowest switching frequency for controlling a maximum load at a lowest alternating input voltage and a highest switching frequency for controlling a minimum load at a highest alternating input voltage.

2. The switching power supply circuit of claim 1, wherein said means for rectifying includes a bridge full-wave rectifier circuit that includes a first rectifier diode having an anode connected to a first end of said secondary winding and a cathode connected to said positive electrode terminal of said secondary side smoothing capacitor, a second rectifier diode having a cathode connected to said first end of said secondary winding and to said anode of said first rectifier diode and an anode connected to a secondary side ground, a third rectifier diode having an anode connected to a second end of said secondary winding and a cathode connected to said positive electrode terminal of said secondary side smoothing capacitor, and a fourth rectifier diode having a cathode connected to said second end of said secondary winding and an anode connected to the secondary side ground, a negative electrode terminal of said secondary side smoothing capacitor being connected to the secondary side ground.

3. The switching power supply circuit of claim 1, wherein a center tap divides said secondary winding into two substantially equal parts and is connected to a secondary side ground, a negative electrode terminal of said secondary side smoothing capacitor is connected to the secondary side ground, and said means for rectifying includes a double-wave rectifier circuit that includes a first rectifier diode having an anode connected to a first end of said secondary winding and a cathode connected to a positive electrode terminal of said secondary side smoothing capacitor, and a second rectifier diode having an anode connected to a second end of said secondary winding and a cathode connected to said positive electrode terminal of said secondary side smoothing capacitor.

4. The switching power supply circuit of claim 1, wherein said means for smoothing includes a first secondary side smoothing capacitor and a second secondary side smoothing capacitor connected in series such that a negative electrode terminal of said first secondary side smoothing capacitor is connected to a positive electrode terminal of said second secondary side smoothing capacitor and to a first end of said secondary winding, and said means for rectifying includes a voltage doubler rectifier circuit that includes a first rectifier diode having an anode connected to a second end of said secondary winding and a cathode connected to a positive electrode terminal of said first secondary side smoothing capacitor, and a second rectifier diode having an anode connected to said second end of said secondary winding and a cathode connected to a secondary side ground, a negative electrode terminal of said second secondary side smoothing capacitor being connected to the secondary side ground.

5. The switching power supply circuit of claim 1, wherein a center tap divides said secondary winding into two substantially equal parts and is connected to a positive terminal of a further secondary side capacitor, and said means for rectifying includes a voltage doubler full-wave rectifier circuit that includes a first rectifier diode having an anode connected to a first end of said secondary winding and a cathode connected to said positive electrode terminal of said secondary side smoothing capacitor, a second rectifier diode having a cathode connected to said first end of said secondary winding and to said anode of said first rectifier diode and an anode connected to a negative terminal of said further secondary side capacitor and to a secondary side ground, a third rectifier diode having an anode connected to a second end of said secondary winding and a cathode connected to said positive electrode terminal of said secondary side smoothing capacitor, and a fourth rectifier diode having a cathode connected to said second end of said secondary winding and an anode connected to said negative terminal of said further secondary side capacitor and to the secondary side ground, a negative electrode terminal of said secondary side smoothing capacitor being connected to the secondary side ground.

* * * * *